United States Patent
Yang et al.

(10) Patent No.: US 11,673,113 B2
(45) Date of Patent: Jun. 13, 2023

(54) RADIONUCLIDE ADSORBENT, METHOD OF PREPARING THE SAME AND METHOD OF REMOVING RADIONUCLIDE USING THE SAME

(71) Applicant: KOREA ATOMIC ENERGY RESEARCH INSTITUTE, Daejeon (KR)

(72) Inventors: Hee Man Yang, Daejeon (KR); Chan Woo Park, Uiwang-si (KR); Kune Woo Lee, Daejeon (KR); Il Gook Kim, Daejeon (KR); In Ho Yoon, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 328 days.

(21) Appl. No.: 17/012,187

(22) Filed: Sep. 4, 2020

(65) Prior Publication Data
US 2021/0077980 A1 Mar. 18, 2021

(30) Foreign Application Priority Data

Sep. 6, 2019 (KR) .......... 10-2019-0110973
Aug. 11, 2020 (KR) .......... 10-2020-0100597

(51) Int. Cl.
*B01J 20/06* (2006.01)
*B01J 20/02* (2006.01)
(Continued)

(52) U.S. Cl.
CPC ....... *B01J 20/0229* (2013.01); *B01J 20/0259* (2013.01); *B01J 20/06* (2013.01);
(Continued)

(58) Field of Classification Search
None
See application file for complete search history.

(56) References Cited

U.S. PATENT DOCUMENTS 7,081,234 B1* 7/2006 Qi .......................... C09D 17/00
423/325
2008/0161444 A1* 7/2008 Hayashi ................ C08K 5/005
522/83
(Continued)

FOREIGN PATENT DOCUMENTS

CN 101219366 7/2008
CN 102794153 11/2012
(Continued)

OTHER PUBLICATIONS

Paul A. Haas (1993) A Review of Information on Ferrocyanide Solids for Removal of Cesium from Solutions, Separation Science and Technology, 28:17-18, 2479-2506, DOI: 10.1080/01496399308017493 (Year: 1993).*

(Continued)

*Primary Examiner* — Chester T Barry
(74) *Attorney, Agent, or Firm* — Lex IP Meister, PLLC

(57) ABSTRACT

The present invention relates to a radionuclide adsorbent, which includes a hollow space (specifically, an area which is entirely empty or in which transition metal oxide particles are present); and a transition metal-ferrocyanide shell (specifically, a transition metal-ferrocyanide shell having a structure in which a plurality of two-dimensional nano flakes overlap or a transition metal-ferrocyanide shell having a structure in which a plurality of three-dimensional nano polyhedrons agglomerate) formed on the space surface, a preparation method thereof, and a method of removing a radionuclide using the same.

13 Claims, 28 Drawing Sheets

(51) Int. Cl.
- *B01J 20/24* (2006.01)
- *B01J 20/28* (2006.01)
- *B01J 20/30* (2006.01)
- *B01J 20/32* (2006.01)
- *G21F 9/12* (2006.01)

(52) U.S. Cl.
CPC ......... *B01J 20/24* (2013.01); *B01J 20/28009* (2013.01); *B01J 20/28021* (2013.01); *B01J 20/3057* (2013.01); *B01J 20/3204* (2013.01); *B01J 20/3221* (2013.01); *B01J 20/3236* (2013.01); *B01J 20/3293* (2013.01); *G21F 9/12* (2013.01)

(56) References Cited

U.S. PATENT DOCUMENTS

| | | |
|---|---|---|
| 2014/0042068 A1 | 2/2014 | Namiki |
| 2014/0194665 A1* | 7/2014 | Ishii ................ B01J 20/3078 588/6 |
| 2015/0231598 A1 | 8/2015 | Zhao et al. |

FOREIGN PATENT DOCUMENTS

| | | |
|---|---|---|
| JP | 2014-206469 | 10/2014 |
| JP | 5957290 | 7/2016 |
| JP | 2017-090373 | 5/2017 |
| JP | 2019-141836 | 8/2019 |
| KR | 20170125597 | 11/2017 |
| KR | 20170125597 A * | 11/2017 |

OTHER PUBLICATIONS

Caletka et al., Adsorption Properties of Titanium(IV) Hexacyanoferrate(II), Journal of Radioanalytical Chemistry, vol. 30 (1976) 119-129 (Year: 1976).*

I. M. Ali et al., "Highly effective removal of 22Na, 134Cs and 60Co from aqueous solustions by titanosilicate: a radiotracer study", J Radioanal Nucl Chem (2010) 285:483-489, May 22, 2010. DOI 10.1007/s10967-010-0612-7.

E.H. Bora et al., "Effcient removal of cesium from low-level radioactive liquid waste using natural and impregnated zeolite minerals", J Hazard Mater. Dec. 15, 2009;172(1)416-22. doi: 10.1016/j.jhazmat.2009.07.033. Epub Jul. 15, 2009.

S. Chitra et al., "Uptake of cesium and strontium by crystalline silicotitanates from radioactive wastes", J Radioanal Nucl Chem (2011) 287:955-960, Oct. 17, 2010. DOI 10.1007/s10967-010-0867-z.

M. Galambos et al., "Cesium sorption on bentonites and montmorillonite K10", J Radioanal Nucl Chem (2010) 284:55-64, Feb. 19, 2010. DOI 10.1007/s10967-010-0480-1.

Eunhye Han et al., "Synergy between Zeolite Framework and Encapsulated Sulfur for Enhanced Ion-Exchange Selectivity to Radioactive Cesium", Chem. Mater. 2018, 30, 16, 5777-5785, Aug. 2, 2018. DOI: 10.1021 /acs.chemmater.8b02782.

Laure Catala et al., "Nanoparticles of Prussian blue analogs and related coordnation polymers: From information storage to biomedical applications", Coordination Chemistry Reviews 346 (2017) 32-61.

Ming Hu et al., "Synthesis of Prussian Blue Nanoparticles with a Hollow Interior by Controlled Chemical Etching", Angew Chem Int Ed Engl. Jan. 23, 2012;51(4):984-8. doi: 10.1002/anie.201105190. Epub Dec. 16, 2011.

Damodara M. Poojary et al., "Synthesis, Crystal Structures, and Ion-Exchange Properties of a Novel Porous Titanosilicate", Chem. Mater. 1994, 6, 2364-2368.

Thierry Vincent et al., "Immobilization of Meta Hexacyanoferrate Ion-Exchangers for the Synthesis of Metal Ion Sorbents—A Mini-Review"., Molecules 2015. 20(11), 20582-20613, Nov. 19, 2015; https://doi.org/10.3390/molecules201119718.

Nagy L. Torad et al., "Large Cs adsorption capability of nanostructured Prussian Blue particles with high accessible surface areas", J. Mater. Chem., 2012,22, 18261-18267. DOI: 10.1039/c2jm32805d.

E.S. Zakaria et al., "Adsorption Behaviour of 134Cs and 22Na Ions on Tin and Titanium Ferrocyanides", Adsorption 10: 237-244, 2004.

Robson, H. E., "CHA chabazite"Verified Syntheses of Zeolitic Materials; Elsevier, pp. 123-124, 2001.

JPO, Office Action of the corresponding Japanese Patent Application No. 2020-149502, dated Aug. 24, 2021.

* cited by examiner

RADIONUCLIDE ADSORBENT, METHOD OF PREPARING THE SAME AND METHOD OF REMOVING RADIONUCLIDE USING THE SAME

CROSS-REFERENCE TO RELATED APPLICATION

This application claims priority to and the benefit of Korean Patent Application No. 10-2019-0110973, filed on Sep. 6, 2019, and Korean Patent Application No. 10-2020-0100597, filed on Aug. 11, 2020, the disclosure of which is incorporated herein by reference in its entirety.

BACKGROUND

1. Field of the Invention

The present invention relates to a radionuclide adsorbent, a method of preparing the same and a method of removing a radionuclide using the same.

2. Discussion of Related Art

Various types of radioactive liquid waste are generated in various industries handling radionuclides, as well as nuclear facilities including nuclear power plants. To treat radioactive liquid waste, various techniques such as adsorption, solvent extraction, chemical precipitation, membrane processing, coagulation, electrodialysis and ion exchange are being used industrially. Among these techniques, adsorption is known as a simple method advantageous for treating a large amount of radioactive liquid waste. As an adsorbent used for such adsorption, various materials may be used according to the type of radionuclide, and generally, an ion exchange resin, clay and zeolite are widely used. Among various radionuclides, radioactive cesium is a major nuclear fission product with a fission yield of 6.337% with Sr (4.505%), and is a heat-loading nuclide, known as a major obstacle for long-term disposal of a nuclear waste. Cs-137 is classified as one of the most dangerous radionuclides both environmentally and ecologically due to a very long half-life of 30.2 years, high solubility in water along with strong gamma rays and similar biological behavior to, particularly, potassium (K). In addition, Sr-90 is known as a major contaminant with radioactive cesium due to a long half-life of 28.9 years and high chemical similarity to calcium.

However, since the concentration of radioactive cesium in various types of radioactive liquid waste generated in the nuclear industry is significantly lower than those of competing ions such as $Na^+$, $K^+$ $Ca^{2+}$ and $Mg^{2+}$, it is difficult to selectively remove only radionuclides, particularly, radioactive cesium and strontium. Moreover, the concentration of a competing ion such as $Na^+$, $K^+$ $Ca^{2+}$ or $Mg^{2+}$ is significantly higher than that of the radioactive cesium released into contaminated water such as radioactive contaminated groundwater, river, seawater or the like, which is generated in the Fukushima or Chernobyl nuclear accident. Accordingly, to selectively remove only radionuclides in radioactive liquid waste from nuclear facilities and radioactive contaminated water generated after a nuclear accident, particularly, radioactive cesium and strontium, it is necessary to develop a novel adsorbent for selectively removing only radioactive nuclides such as cesium and strontium, other than a conventional adsorbent such as an ion exchange resin, clay or zeolite without selectivity to the radioactive cesium.

Currently reported major adsorbents for removing radioactive cesium or strontium include crystalline silicotitanate (CST), vanadosilicate, and metal sulfides. However, since these materials use an expensive heavy metal (Sn, Sb, In, Ge, V or Ti), there is a limit to mass production, and these materials are difficult to be synthesized. As an alternative, metal ferrocyanides (MFCs), in which a metal ion and cyanide (—CN—) are coordinated, having high selectivity for cesium may be easily prepared at a low price by a simple chemical reaction between the metal ion and a ferrocyanide salt. However, the conventional metal-ferrocyanide synthesized by the reaction between a metal ion and a ferrocyanide salt generally has a very irregular granular form with a size of tens of nanometers to a submicron level or more due to agglomeration. Accordingly, the synthesized conventional metal-ferrocyanide is difficult to be used as a filler in a column due to various size distributions, and to be directly used in liquid waste, an additional recovery process device such as a separate centrifuge or high-performance separator for recovering metal-ferrocyanide after use is needed. In addition, the aggregated metal-ferrocyanide is known to have a relatively low cesium adsorption rate and a relatively small maximum cesium adsorption amount, compared with a conventional adsorbent such as zeolite or clay.

Recently, to improve the cesium adsorption rate of metal-ferrocyanide and facilitate the recovery of an adsorbent after use, research on a complex in which nano-sized metal-ferrocyanide binds to a surface of or in a functional material such as a polymer matrix, silica, carbon such as activated carbon, CTN, graphene oxide and the like, or magnetic materials has been actively performed. Such a functional material plays a supporting role in preventing the agglomeration of metal-ferrocyanide, thereby synthesizing metal-ferrocyanide in a nano-sized region. As the particle size of metal-ferrocyanide decreases, a specific surface area increases, and thus a cesium adsorption characteristic is improved. Due to the presence of a support, the adsorbent is easily recovered after use, and is able to be used as a filler in a column. However, the functional material itself, which is used in the complex as described above, has no function of selectively adsorbing cesium such that an adsorption capacity of the adsorbent, which can adsorb cesium, per unit weight is reduced. Due to various components in the complex, synthesis is not simple and performed in multiple steps, and particularly, a complex containing an organic component such as a polymer matrix or carbon lacks safe under a radioactive condition, and the disposal of final radioactive waste is not easy.

PRIOR ART DOCUMENT

Patent Document

Japanese Patent Publication No. 5957290 (Jun. 24, 2016)

SUMMARY OF THE INVENTION

To effectively/selectively remove a radionuclide, the present invention is directed to providing a radionuclide adsorbent, which includes a hollow space (specifically, an area which is entirely empty or in which transition metal oxide particles are present); and a transition metal-ferrocyanide shell formed on the surface of the area (specifically, a transition metal-ferrocyanide shell having a structure in which a plurality of two-dimensional nano flakes overlap or a transition metal-ferrocyanide shell having a structure in which a plurality of three-dimensional nano polyhedrons agglomerate) through optimization of conditions for a chemical reaction between transition metal oxide particles and a ferrocyanide salt.

However, technical problems to be solved in the present invention are not limited to the above-described problems, and other problems which are not described herein will be fully understood by those of ordinary skill in the art from the following descriptions.

The present invention provides a method of preparing a radionuclide adsorbent, which includes: (a) preparing a dispersion in which transition metal oxide particles and a ferrocyanide salt are dispersed in an acidic solution; and (b) forming transition metal-ferrocyanide on the surface of the transition metal oxide particle by reacting transition metal ions and the ferrocyanide salt in the dispersion.

In one embodiment of the present invention, a radionuclide adsorbent, which includes a hollow space; and a transition metal-ferrocyanide shell formed on the surface of the area, is provided.

In another embodiment of the present invention, a bead-type radionuclide adsorbent, which includes a bead; and the radionuclide adsorbent encapsulated in the bead, is provided.

In still another embodiment of the present invention, a composite radionuclide adsorbent, which includes a core; and the radionuclide adsorbent formed on the core, is provided.

In yet another embodiment of the present invention, a method of removing a radionuclide, which includes: dispersing the radionuclide adsorbent in a solution containing a radionuclide, and then recovering the radionuclide by adsorbing it onto the radionuclide adsorbent.

DETAILED DESCRIPTION OF EXEMPLARY EMBODIMENTS

Figure 1:
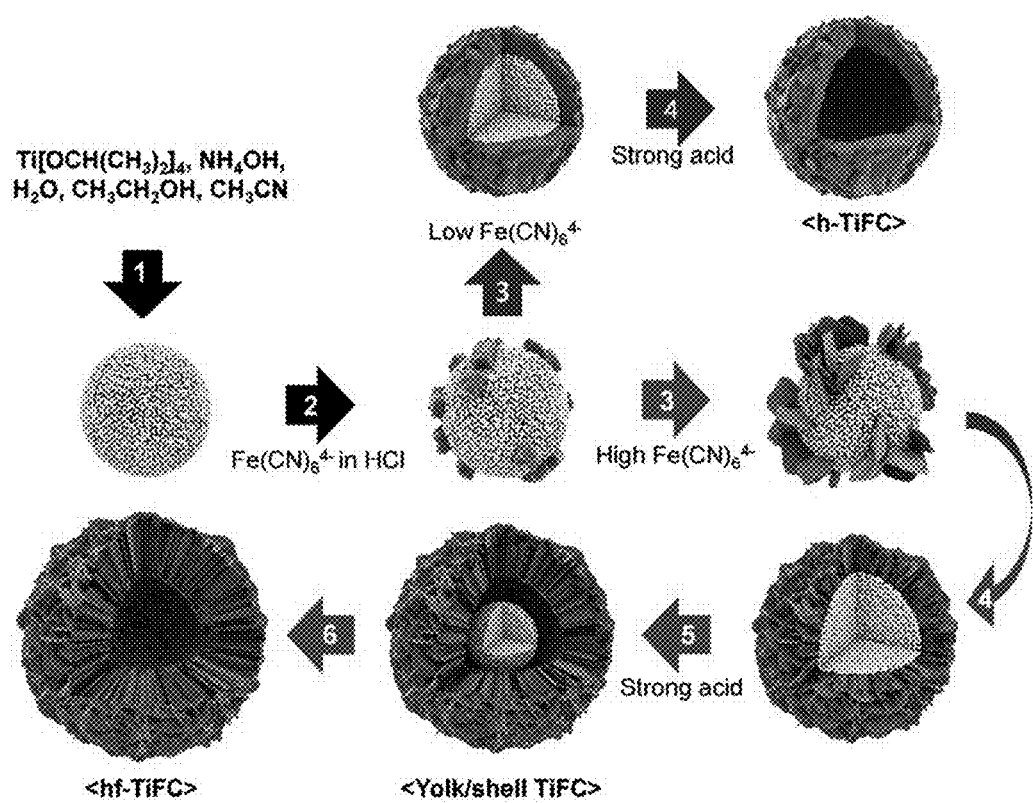
FIG. 1 is a schematic diagram illustrating the mechanism of forming hf-TiFC, f-TiFC and h-TiFC according to the concentration of $Fe(CN)_6^{4-}$ (FC) and an acid (HCl).

The inventors had studied to prepare a radionuclide adsorbent which has a regular shape and a high specific surface area using transition metal-ferrocyanide, and thus prepared a radionuclide adsorbent including hollow space (specifically, an area which is entirely hollow or in which transition metal oxide particles are present); and a transition metal-ferrocyanide shell formed on the surface of the area (specifically, a transition metal-ferrocyanide shell having a structure in which a plurality of two-dimensional nano flakes overlap or a transition metal-ferrocyanide shell having a structure in which a plurality of three-dimensional nano polyhedrons agglomerate) through optimization of conditions for a chemical reaction between transition metal oxide particles and a ferrocyanide salt. Thereafter, it was confirmed that a radionuclide may be effectively/selectively removed, and thus the present invention was completed.

The "radionuclide" used herein includes all of monovalent and divalent or higher cationic radionuclides, and is interpreted in a broad sense, as including a monovalent cationic radionuclide such as radioactive cesium, divalent or higher cationic radionuclides such as radioactive strontium, radioactive cobalt, radioactive zinc and radioactive barium; trivalent cationic radionuclides such as radioactive chromium, radioactive europium, radioactive terbium, radioactive neodymium and radioactive americium; a tetravalent cationic radionuclide such as radioactive thorium; hexavalent radionuclides such as radioactive molybdenum and radioactive uranium; and a heptavalent cationic radionuclide such as radioactive radium.

Particularly, the radioactive cesium includes $^{137}Cs$, $^{135}Cs$ and $^{134}Cs$, in which $^{137}Cs$ is a major radioactive isotope generated in nuclear fission, and a toxic material having a half-life of 30.17 years. In addition, the radioactive strontium includes $^{89}Sr$ and $^{90}Sr$, in which $^{90}Sr$ is also a major radioactive isotope generated in nuclear fission, has a half-life of 27.7 years and has a problem of being accumulated bone or blood-like tissue (bone marrow) since it acts like calcium in the body.

Hereinafter, the present invention will be described in detail.

Method of Preparing Radionuclide Adsorbent

The present invention provides a method of preparing a radionuclide adsorbent, which includes: (a) preparing a dispersion in which transition metal oxide particles and a ferrocyanide salt are dispersed in an acidic solution; and (b) forming transition metal-ferrocyanide on the surface of the transition metal oxide particle by reacting transition metal ions and the ferrocyanide salt in the dispersion.

The radionuclide adsorbent prepared according to the present invention includes a hollow space as a core; and a transition metal-ferrocyanide shell formed on the surface of the area as a shell. Here, the core is an area which is hollow by dissolving all of the metal oxide particles, and in some cases, the metal oxide particles may not be entirely dissolved, but may remain while being spaced apart from the transition metal-ferrocyanide shell (that is, a yolk-shell structure). Meanwhile, the transition metal-ferrocyanide shell constituting the shell may be a transition metal-ferrocyanide shell having a three-dimensional structure in which a plurality of two-dimensional nano flakes overlap (hierarchical or petal-like structure), or a transition metal-ferrocyanide shell having a three-dimensional structure in which a plurality of three-dimensional nano polyhedrons agglomerate.

The "two-dimensional nano flake" used herein refers to a nano-sized thin piece or fragment, and should be interpreted in a broad sense encompassing two-dimensional structures. In addition, the "three-dimensional nano polyhedron" used herein refers to a nano-sized polyhedron such as hexahedron (e.g., cube), and should be interpreted in a broad sense encompassing three-dimensional structures.

When the radionuclide adsorbent prepared according to the present invention includes a core, which is a completely hollow space, and a shell with a three-dimensional structure in which a plurality of two-dimensional nano flakes overlap (hierarchical or petal-like structure), it is expressed as "hollow flower-like titanium ferrocyanide (hf-TiFC)" herein, and when the radionuclide adsorbent prepared according to the present invention includes a core, which is a completely hollow space, and a shell with a three-dimensional structure in which a plurality of three-dimensional nano polyhedrons agglomerate, it was expressed as "hollow titanium ferrocyanide (h-TiFC)" herein.

Meanwhile, when the radionuclide adsorbent prepared according to the present invention includes a core, which is a partially-hollow space in which transition metal oxide particles remain, and a shell with a three-dimensional structure, it was expressed as "yolk/shell TiFC" herein.

First, the method of preparing a radionuclide adsorbent according to the present invention includes preparing a dispersion in which transition metal oxide particles and a ferrocyanide salt are dispersed in an acidic solution [Step (a)].

The transition metal oxide particles may be tetravalent transition metal oxide particles, and serve to adsorb various radionuclides. The transition metal oxide particles may be particles having both of a single structure or porous structure among the transition metal oxide particles, for example, transition metal oxide particles including one or more of Ti, Zn, Cu and Mn, preferably, transition metal oxide particles including one or more of $TiO_2$, $ZnO$, $CuO$, $Cu_2O$, $MnO$, $MnO_2$, $Mn_2O_3$ and $Mn_3O_4$, and more preferably, $TiO_2$ particles, but the present invention is not limited thereto. Particularly, when the oxide particle is a $TiO_2$ particle, radioactive cesium, radioactive cobalt, radioactive europium, radioactive thorium, or radioactive molybdenum may be adsorbed and when the oxide particle is a ZnO particle, radioactive strontium, radioactive thorium or radioactive uranium may be adsorbed, and when the oxide particle is a $MnO$, $MnO_2$, $Mn_2O_3$ or $Mn_3O_4$ particle, radioactive strontium, radioactive europium or radioactive uranium may be adsorbed. The transition metal oxide particle is known as a particle that can be synthesized to have a single or porous structure under various synthesis conditions, and thus, the transition metal oxide particle may react with a ferrocyanide salt under special reaction conditions, thereby forming a Ti-ferrocyanide shell, a Zn-ferrocyanide shell, a Cu-ferrocyanide shell or a Mn-ferrocyanide shell, which has a three-dimensional structure.

For example, the $TiO_2$ particle is hydrated, and has an average diameter of approximately 20 nm to 1 μm, and preferably approximately 300 nm to 800 nm, but the present invention is not limited thereto. In an embodiment of the present invention, after a cesium adsorption experiment, since a syringe filter used to remove Ti-ferrocyanide remaining in a cesium solution has an MWCO pore size of 450 nm, in consideration of this, a TiO$_2$ particle having an average diameter of 500 nm was used.

The hydrated TiO$_2$ particle may be prepared by hydrolysis and self-assembly using a variety of conventionally known precursors, and as a precursor, a titanium alkoxide compound having 1 to 10 carbon atoms may be used, and for example, a compound represented by Formula 1 may be used:

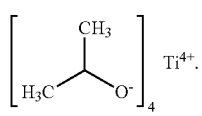

[Formula 1]

Here, for hydrolysis and self-assembly, a mixed solution including an ammonia solution, water, ethanol and acetonitrile may be used.

The ferrocyanide salt may be one or more selected from the group consisting of sodium ferrocyanide (Na$_4$Fe(CN)$_6$), potassium ferrocyanide (K$_4$Fe(CN)$_6$), ammonium ferrocyanide ((NH$_4$)$_4$Fe(CN)$_6$) and potassium hexacyanoferrate(III) (K$_3$Fe(CN)$_6$), but the present invention is not limited thereto. The acidic solution may be a 0.1 M to 2.0 M HCl solution, and preferably, a 1.0 M to 2.0 M HCl solution, but the present invention is not limited thereto. Here, when the molar concentration of HCl is too low, the transition metal oxide particle may not be well dissolved, and thus a hollow space is not formed. When the hollow space is formed, the radioactive cesium may not move into transition metal-ferrocyanide, and a different divalent or higher cationic radionuclide (radioactive strontium, etc.), rather than radioactive cesium, may move into the hollow space to be trapped. Accordingly, only because of the presence of a hollow space, it is possible to have divalent or higher cationic radionuclide (radioactive strontium, etc.) adsorption performance. In addition, when a transition metal oxide remains in the area (that is, a yolk-shell structure), various radionuclides may be adsorbed by chemical bonding (mainly, electrostatic attraction) with a hydrated transition metal oxide.

Meanwhile, the concentration of the transition metal oxide particles in the dispersion may be 0.1 to 10 g/L, the concentration of a ferrocyanide salt in the dispersion may be 0.001 to 1.0 M, preferably 0.01 to 0.5 M, more preferably 0.05 to 0.3 M, and most preferably 0.15 to 0.3 M, but the present invention is not limited thereto. The concentration of the ferrocyanide salt in the dispersion is a factor that determines the structure of the transition metal oxide-ferrocyanide, and when the concentration of the ferrocyanide salt in the dispersion is too low, the transition metal-ferrocyanide constituting the shell has a structure in which a plurality of three-dimensional nano cubes agglomerate. Such a structure in which a plurality of three-dimensional nano cubes agglomerate has a limitation of low specific surface area, compared with a structure in which a plurality of two-dimensional nano flakes overlap. When the concentration of the ferrocyanide salt in the dispersion is too high, the transition metal-ferrocyanide constituting the shell has a structure in which a plurality of two-dimensional nano flakes excessively overlap, and here, because of the high density of the two-dimensional nano flakes, the specific surface area is lowered again.

Subsequently, the method of preparing a radionuclide adsorbent according to the present invention includes forming transition metal-ferrocyanide on the surface of a transition metal oxide particle by reacting transition metal ions generated on the surface of the transition metal oxide particle with the ferrocyanide salt [Step (b)].

According to the reaction between the transition metal ions and the ferrocyanide salt in the dispersion, transition metal-ferrocyanide may be formed on the surface of the transition metal oxide particle, and as the reaction proceeds, the transition metal-ferrocyanide may be spaced apart from the surface of the transition metal oxide particle. This may be confirmed through the presence of a cyano group (—C≡N—).

Meanwhile, the reaction may be performed at 10 to 80° C. for 10 minutes to 72 hours. For example, when the concentration of the ferrocyanide salt in the dispersion is 0.3 M or less, the reaction may be performed at 20 to 40° C. for 2 to 15 hours, thereby forming a core with a hollow space. Particularly, the reaction time may be adjusted within 6 to 10 hours, thereby forming a yolk core, and therefore, both radioactive cesium and radioactive strontium may be effectively removed at the same time. When the concentration of the ferrocyanide salt in the dispersion is more than 0.3 M, the reaction may be performed at 20 to 40° C. for 4 to 15 hours, thereby forming a core with a hollow space.

Radionuclide Adsorbent

The present invention provides a radionuclide adsorbent, which includes a hollow space; and a transition metal-ferrocyanide shell formed on the surface of the area.

The radionuclide adsorbent according to the present invention may be prepared by (a) preparing a dispersion in which transition metal oxide particles and a ferrocyanide salt are dispersed in an acidic solution; and (b) forming transition metal-ferrocyanide on the surface of the transition metal oxide particle by reacting transition metal ions and the ferrocyanide salt in the dispersion.

First, the radionuclide adsorbent according to the present invention has a hollow space as a core.

The hollow space may be formed by dissolving transition metal oxide particles by sufficiently increasing the molar concentration of HCl in an acidic solution. Like this, due to the presence of the hollow space, the radioactive cesium may not move into transition metal-ferrocyanide, and a different divalent or higher cationic radionuclide (radioactive strontium, etc.), rather than radioactive cesium, may move into the hollow space to be trapped. Accordingly, only because of the presence of a hollow space, it is possible to have divalent or higher cationic radionuclide (radioactive strontium, etc.) adsorption performance. In addition, when a transition metal oxide remains inside (that is, a yolk-shell structure), various radionuclides may be adsorbed by chemical bonding (mainly, electrostatic attraction) with a hydrated transition metal oxide.

That is, the hollow space may be a completely empty space, but in some cases, may further include transition metal oxide particles, which are spaced apart from the transition metal-ferrocyanide shell, in the hollow space (that is, yolk-shell structure). In other words, the transition metal oxide particles are not dissolved and thus do not react with the ferrocyanide salt, and may be spaced apart from the transition metal-ferrocyanide shell. Accordingly, a divalent or higher cationic radionuclide (radioactive strontium, etc.), rather than radioactive cesium, moves to the hollow space spaced apart therefrom, and then is additionally adsorbed at an adsorption site of the remaining hydrated transition metal oxide particles.

The average diameter of the hollow space is the same as the size of the transition metal oxide particle used herein, and may be approximately 20 nm to 1 μm, and preferably approximately 300 to 800 nm, but the present invention is not limited thereto.

Ad then, the radionuclide adsorbent according to the present invention includes a transition metal-ferrocyanide shell formed on a surface of a hollow space as a shell, here, the metal-ferrocyanide shell may have various three-dimensional structures.

The transition metal-ferrocyanide shell may have various three-dimensional structures to increase the specific surface area of the radionuclide adsorbent. Specifically, the transition metal-ferrocyanide shell may be a transition metal-ferrocyanide shell with a three-dimensional structure in which a plurality of two-dimensional nano flakes overlap or a transition metal-ferrocyanide shell with a three-dimensional structure in which a plurality of three-dimensional nano polyhedrons agglomerate. Here, the structure in which a plurality of two-dimensional nano flakes overlap may be formed by optimizing the concentration of a ferrocyanide salt in the dispersion. As described above, the structure in which the plurality of two-dimensional nano flakes overlap has a high specific surface area.

In addition, the average thickness (the average thickness corresponding to the thinnest part) of the two-dimensional nano flakes may be approximately 10 to 50 nm.

Meanwhile, the water content in the radionuclide adsorbent may be 10 to 20 wt % with respect to the total content of the radionuclide adsorbent, and preferably 10 to 15 wt %, but the present invention is not limited thereto.

In addition, since the radionuclide adsorbent has a regular form, the specific surface area may increase, and the specific surface area of the radionuclide adsorbent may be 10 to 300 $m^2/g$, preferably 30 to 200 $m^2/g$, and more preferably, 50 to 200 $m^2/g$, but the present invention is not limited thereto. Therefore, the radionuclide may be effectively/selectively removed.

Accordingly, the radionuclide adsorbent may selectively remove radioactive cesium; or a divalent or higher cationic radionuclide. The transition metal-ferrocyanide shell having a three-dimensional structure in the radionuclide adsorbent selectively removes radioactive cesium, and in the radionuclide adsorbent, a hollow space or transition metal oxide particles remaining therein may selectively remove a divalent or higher cationic radionuclide such as radioactive strontium.

In addition, the radioactive cesium or divalent or higher cationic radionuclide may be present within the range of pH 1 to pH 11, and since the radionuclide adsorbent is present in a form in which the transition metal ions are maximally oxidized, it is no longer oxidized and may maintain its structure and shape well under a strong acid condition. Therefore, the radionuclide adsorbent may effectively/selectively remove the radionuclide in the range of pH 1 to pH 11, and particularly, even under a strong acid condition such as pH 1 to pH 3.

Meanwhile, the present invention provides a bead-type radionuclide adsorbent, which includes a bead; and the radionuclide adsorbent encapsulated in the bead.

The bead-type radionuclide adsorbent according to the present invention is applied to a column to facilitate recovery, and includes a bead; and the radionuclide adsorbent encapsulated in the bead.

The bead may be an alginate bead, and alginate is a type of eco-friendly polysaccharide, structurally, consisting of an anionic block in which 1,4-linked-L-guluronic acid (G) and D-mannuronic acid (M) are linked. The alginate may be water-soluble, or may be converted into an insoluble hydrogel in the presence of a specific divalent cation such as Ca, Ba and Sr, and the alginate bead has excellent adsorption performance with respect to several rare earth-transition metals including radioactive strontium.

In addition, the bead-type radionuclide adsorbent may further include a divalent or higher cationic radionuclide adsorbent, encapsulated in the bead, as the divalent or higher cationic radionuclide adsorbent, various known adsorbents such as nanoscale zero-valent irons (NZVI); transition metal sulfides; zeolite; transition metal-organic frameworks; transition metal carbides/nitrides, cellulose nanocrystals/nanofibrils; layered double hydroxides (LDH); and hydroxyapatite may be used.

In one embodiment of the present invention, as a divalent or higher cationic radionuclide adsorbent, zeolite NaX corresponding to a radioactive strontium adsorbent was used. Therefore, both of the radioactive cesium and the divalent or higher cationic radionuclide may be effectively removed at the same time.

In addition, the present invention provides a composite radionuclide adsorbent, including a core and the radionuclide adsorbent formed on the core.

The composite radionuclide adsorbent according to the present invention includes a core; and the radionuclide adsorbent formed on the core. That is, in the radionuclide adsorbent, there is a hollow space between a transition metal-ferrocyanide shell and the core. Here, transition metal oxide particles which are spaced apart from the transition metal-ferrocyanide shell and present on the core may be further included in the space.

First, the core may be a magnetic core, and in this case, magnetic recovery is possible. Before the radionuclide adsorbent is formed on the magnetic core, a $SiO_2$ layer may be coated on the magnetic core.

Meanwhile, the core may be the core of a divalent or higher cationic radionuclide adsorbent, and as the divalent or higher cationic radionuclide adsorbent, various known adsorbents such as nanoscale zero-valent irons (NZVI); transition metal sulfides; zeolite; transition metal-organic frameworks; transition metal carbides/nitrides, cellulose nanocrystals/nanofibrils; layered double hydroxides (LDH); and hydroxyapatite may be used. In this case, both of the radioactive cesium and the divalent or higher cationic radionuclide may be effectively removed at the same time.

Method of Removing Radionuclide

The present invention provides a method of removing a radionuclide, which includes dispersing the radionuclide adsorbent in a solution containing a radionuclide, adsorbing the radionuclide onto the radionuclide adsorbent, and recovering the radionuclide.

The radionuclide adsorbent and the method of preparing the same have been described above, and duplicated descriptions will be omitted. Since the radionuclide adsorbent has a regular shape, it has a high specific surface area, and thus the radionuclide may be effectively/selectively removed.

The method of removing a radionuclide according to the present invention includes dispersing the radionuclide adsorbent in a solution containing a radionuclide, adsorbing the radionuclide onto the radionuclide adsorbent, and then recovering the radionuclide-adsorbed radionuclide adsorbent from the solution.

For recovery, the radionuclide-adsorbed radionuclide adsorbent may be recovered easily by a conventional particle recovery process using a centrifuge or filter.

In addition, to facilitate the final disposal of the recovered radionuclide adsorbent, the transition metal-ferrocyanide is preferably converted into transition metal carbonate, which is an inorganic component. Accordingly, disposal stability may be improved by removing cyanide (—CN—), which is an organic component present in the transition metal-ferrocyanide. This process is preferably performed under a strong base condition (pH 9 to 12), but the present invention is not limited thereto. The recovered radionuclide adsorbent is classified as radioactive waste, the converted transition metal carbonate (e.g., titanate) can be easily disposed of through a vitrification or cementation method.

Meanwhile, when the radionuclide adsorbent is a bead type, it is easy to recover it using a column, and when a magnetic core is applied to the radionuclide adsorbent, magnetic recovery is possible.

Accordingly, the radionuclide adsorbent according to the present invention is prepared through optimization of conditions of the chemical reaction between the transition metal oxide particles and the ferrocyanide salt, and since the radionuclide adsorbent includes a hollow space (specifically, an area which is entirely empty or in which transition metal oxide particles are present); and a transition metal-ferrocyanide shell formed on the surface of the area (specifically, a transition metal-ferrocyanide shell having a structure in which a plurality of two-dimensional nano flakes overlap or a transition metal-ferrocyanide shell having a structure in which a plurality of three-dimensional nano polyhedrons agglomerate) through optimization of conditions for a chemical reaction between transition metal oxide particles and a ferrocyanide salt, thereby having a regular form and a high specific surface area, and therefore, the radionuclide can be effectively/selectively removed.

According to the present invention, the radionuclide adsorbent can be useful for purifying various types of radioactive liquid waste (particularly, a strong acidic soil liquid waste generated in decontamination of soil contaminated with a radionuclide) generated in various fields dealing with radionuclides as well as nuclear facilities including nuclear power plants, and effectively used to restore various water environments (groundwater, rivers, streams, seawater, etc.) contaminated with a radionuclide in severe accidents such as the Fukushima nuclear power plant accident.

Hereinafter, to help in understanding the present invention, exemplary examples will be suggested. However, the following examples are merely provided to more easily understand the present invention, and not to limit the present invention.

EXAMPLES

Example 1: Preparation of Radionuclide Adsorbent

Synthesis of Hydrated $TiO_2$ Particles (Average Diameter: 500 nm)

A solution (250 mL) in which a $NH_4OH$ solution (28%, 0.42 mL), $H_2O$ (0.91 mL), ethanol (150 mL) and acetonitrile (100 mL) were mixed was prepared, and titanium isopropoxide represented by Formula 1 was added thereto, thereby preparing a milky solution. The resulting solution was further stirred for 6 hours, and hydrated $TiO_2$ particles were recovered using a centrifuge and then washed with water and ethanol several times, followed by drying in a vacuum oven at 60° C.

[Formula 1]

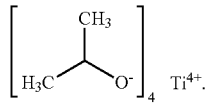

Preparation of Radionuclide Adsorbent (h-TiFC or Hf—TiFC)

100 mg of hydrated $TiO_2$ particles were dispersed in a 1.5 M HCl solution and rapidly mixed with a 1.5 M HCl solution containing potassium ferrocyanide (FC, $K_4Fe(CN)_6 \cdot 3H_2O$), thereby preparing a dispersion. Here, the concentration of the hydrated $TiO_2$ particles in the dispersion for preparing hollow titanium ferrocyanide (h-TiFC) or hollow flower-like titanium ferrocyanide (hf-TiFC) is 1.0 g/L. In addition, the concentration of FC in the dispersion for preparing h-TiFC is 0.1 M, and the concentration of FC in the dispersion for preparing hf-TiFC is 0.2 M. A reaction was performed at 25° C. for 10 minutes to 12 hours, recovery was performed using a membrane filter (pore size: 0.45 μm), and washing with deionized water was performed several times, followed by drying at 60° C. in a vacuum oven.

Adsorption Kinetics and Isotherm Using Non-Radioactive Cesium

Adsorption kinetics and isotherms were analyzed by a batch test at 25° C. The initial Cs concentration used in an adsorption kinetics test is 68.7 ppm. 20 mg of h-TiFC or hf-TiFC was added to a 68.8 ppm Cs solution (20 mL), and stirred for various times, for example, 5 to 1,440 minutes. Afterward, h-TiFC or hf-TiFC was removed using a membrane filter (pore size: 0.45 μm). The Cs concentration before/after the reaction was analyzed by inductively-coupled plasma mass spectrometry (ICP-MS). Adsorption kinetics was calculated by the following equation (1) corresponding to the pseudo-secondary model:

$$dq_t/dt = k_2(q_e q_t)^2 \qquad (1)$$

Here, $k_2$ is a pseudo second order rate constant (g min$^{-1}$); $q_e$ is the amount of $Cs^+$ captured at equilibrium (mg g$^{-1}$), and $q_t$ is the amount (mg g$^{-1}$) of $Cs^+$ captured at time t (min). The integrated form of the equation may be reconfigured as shown in the following equation (2):

$1/q_t = 1/k_2 \, q_e^2 + t/q_e$ (2) The adsorption isotherm test was performed by stirring 20 mg of h-TiFC or hf-TiFC with 20 mL of a 50 to 1000 ppm Cs solution. After reaching adsorption equilibrium, h-TiFC or hf-TiFC was removed using a membrane filter (pore size: 0.45 μm). The Cs concentration before/after the reaction was analyzed by ICP-MS. The adsorption isotherm was calculated by the following equation (3) corresponding to the Langmuir isotherm:

$$q = q_{max} \, bC_e/(1+bC_e) \qquad (3)$$

Here, $q_e$ and $q_{max}$ are equilibrium adsorption capacity and maximum adsorption capacity, respectively. Here, b is the Langmuir constant (kg mg$^{-1}$) indicating the affinity between $Cs^+$ and a solid. The integrated form of the equation may be reconfigured as shown in the following equation (4):

$$1/q_e = 1/q_{max} + 1/(q_{max} \, b \, C_e) \qquad (4)$$

Cs Selectivity in Various pH Solutions and Salt Solutions

For a Cs adsorption test under various pH conditions (pH 1 to 11) and a Cs adsorption test under conditions in which there are competing ions such as $Na^+$ and $K^+$, the pH was adjusted with NaOH and HCl, and NaCl (99%, Junsei Chemicals) and KCl (99%, Junsei Chemicals) were used as competing ions. Here, the concentration of the used Cs was approximately 1 ppm. In addition, in a test on the influence of competing ions, the molar ratios of $Na^+/Cs^+$ and $K^+/Cs^+$ are 100, 1,000, 10,000 and 100,000. In the test, h-TiFC or hf-TiFC and various comparative groups were used, and the used comparative groups were the protonated form of crystalline silicotitanate (HCST; Poojary, D. M.; Cahill, R. A.;

Clearfield, A. Synthesis, Crystal Structures, and Ion-Exchange Properties of a Novel Porous Titanosilicate. Chem. Mater. 1994, 6, 2364-2368.), chabazite (CHA; Robson, H. E. Verified Syntheses of Zeolitic Materials; Elsevier, 2001.), and the granular form of titanium ferrocyanide (g-TiFC; Zakaria, E. S.; Ali, I. M.; Aly, H. F. Adsorption Behaviour of 134Cs and 22Na Ions on Tin and Titanium Ferrocyanides. Adsorption 2004, 10, 237-244.). After reaching adsorption equilibrium by a reaction of 10 mg of various adsorbents with 10 mL of a solution, an adsorbent was removed using a membrane filter (pore size: 0.45 μm). The Cs concentrations before/after the reaction were assessed by ICP-MS. A $Cs^+$ removal efficiency (%) and a distribution coefficient ($K_d$, mL $g^1$) were calculated by the following Formulas (5) and (6), respectively:

$$Cs^+ \text{removal } (\%) = (C_i - C_e)/C_i \times 100 \quad (5)$$

$$K_d(mL\ g^{-1}) = V(C_i - C_e)/C_e m \quad (6)$$

Here, $C_i$ is the initial $Cs^+$ concentration (ppm); $C_e$ is an equilibrium $Cs^+$ concentration (ppm); V is the volume of a solution (mL); and m is the mass of an adsorbent (g).

Radioactive Test

For a radioactive test, various adsorbents and a contaminated liquid containing radioactive cesium ($^{137}$cs) in an aqueous solution of simulated seawater or simulated radioactive liquid waste (5.7 M $Na^+$ and pH 1) were used. 125 ppm $Na^+$, 25 ppm $Ca^{2+}$, 10 ppm $Mg^{2+}$ and 5 ppm $K^+$ were added, the simulated radioactive liquid waste was adjusted to pH 1 with $HNO_3$, and a 5.7 M $Na^+$ solution was used. After reaching the adsorption equilibrium by a reaction between simulated seawater or simulated radioactive liquid waste containing radioactive cesium with various adsorbents, an adsorbent was removed using a membrane filter (pore size: 0.45 μm). The radioactive Cs radioactivity before/after the reaction was assessed by a HPGe detector (Canberra, USA), and the $Cs^+$ removal efficiency (%) and the decontamination factor (DF) were calculated by the following Formulas (7) and (8), respectively.

$$Cs^+ \text{removal } (\%) = (A_0 - A_f)/A_0 \times 100 \quad (7)$$

$$DF = A_0/A_f \quad (8)$$

Here, $A_0$ and $A_f$ are $^{137}$Cs activity in the initial solution and $^{137}$Cs activity in the final solution after adsorbent treatment, respectively.

Figure 2:
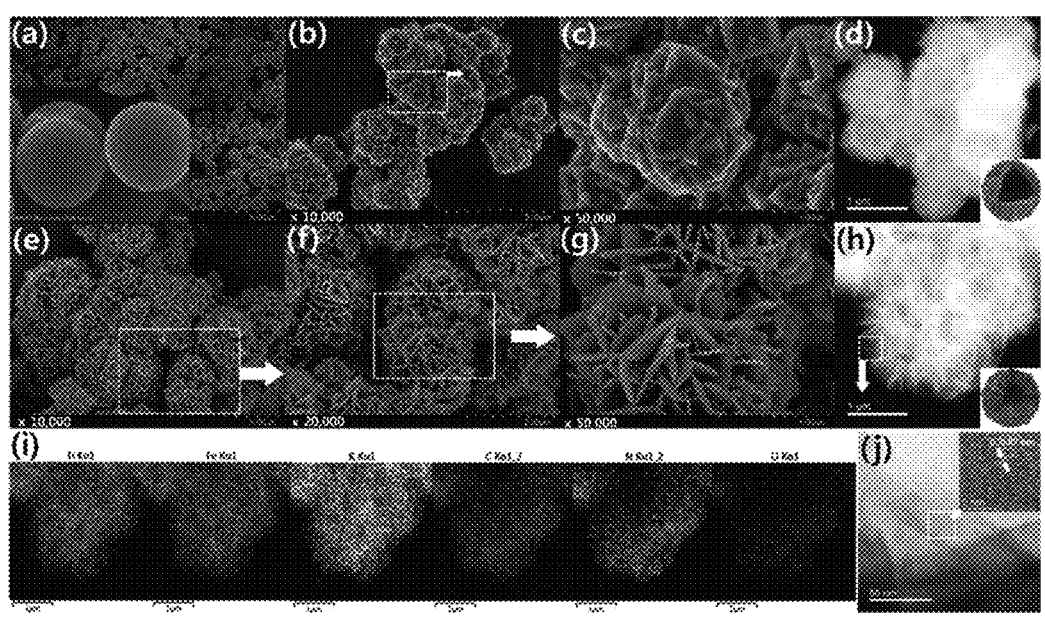
FIG. 2 shows the SEM images of (a) hydrated $TiO_2$ particles, (b, c) h-TiFC and (e,f,g) hf-TiFC, the STEM images of (d) h-TiFC and (h) hf-TiFC, (i) EDS elemental mapping of hf-TiFC, and (j) the high magnification TEM image of an edge of the two-dimensional hf-TiFC flake.
Figure 3:
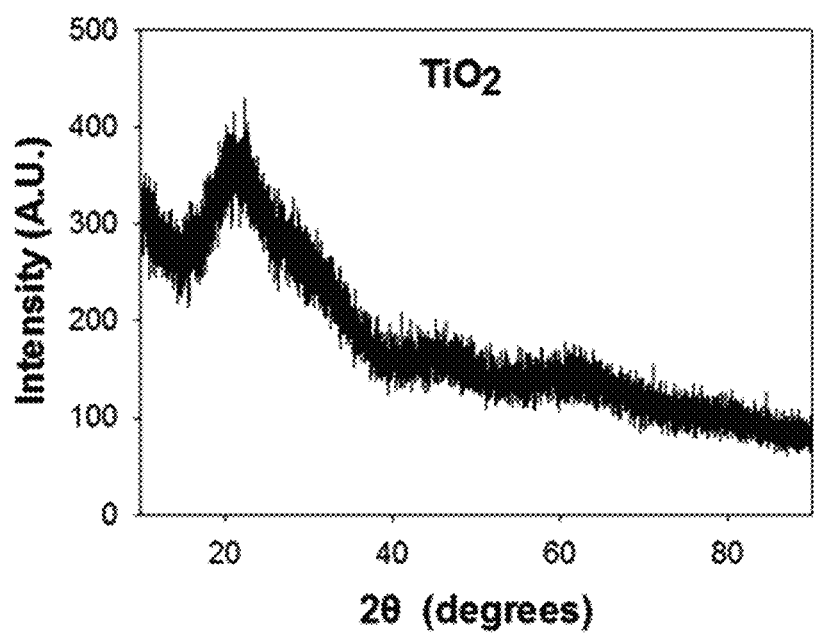
FIG. 3 is an XRD pattern graph of hydrated $TiO_2$ particles.

The SEM image of FIG. 2(a) shows that the synthetic hydrated $TiO_2$ particle is 500 nm in size, and consisted of numerous nano-sized hydrated $TiO_2$. In addition, in FIG. 3, the synthetic hydrated $TiO_2$ particle through XRD analysis is amorphous. The BET surface area of the synthetic hydrated $TiO_2$ particle is very high at 403 $m^2\ g^{-1}$, which seems to be due to an empty space between the agglomerated nano-sized hydrated $TiO_2$.

Generally, the granular form of TiFC (g-TiFC) is easily synthesized by a reaction between a ferrodioxide and $Ti^{4+}$ of $TiCl_4$. In the present invention, the hydrated $TiO_2$ was dissolved under an acidic condition, and used as a $Ti^{4+}$ source. TiFC was synthesized by stirring under the concentration condition of 1 g/L of the fixed hydrated $TiO_2$ particles, 0.1 M or 0.2 M FC and 1.5 M HCl, at room temperature for 12 hours. Here, 0.1 M FC is the condition for an FC concentration to generally synthesize g-TiFC.

Figure 4:
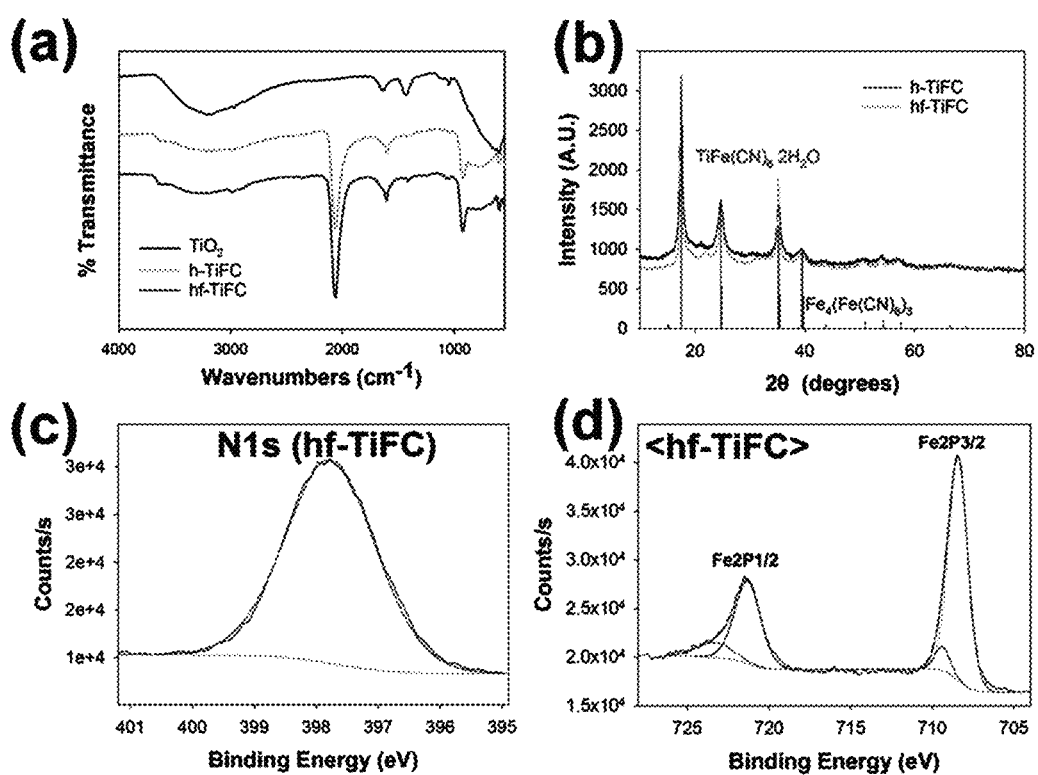
FIG. 4 shows the (a) FT-IR spectrum and (b) XRD pattern graph of h-TiFC and hf-TiFC, and (c) N1s and (d) Fe2p XPS spectrum graphs of hf-TiFC.

As shown in FIG. 4(a), compared with the FTIR analysis result of hydrated $TiO_2$, samples (for both samples, conditions such as a reaction time of 12 hours, 1 g/l of $TiO_2$ and 1.5 M HCl are the same) reacting with 0.1M and 0.2M FC show new peaks at 2065 $cm^{-1}$, indicating cyanide (—C≡N—) stretching vibration, and through the result, it can be indirectly confirmed that TiFC was synthesized. In addition, in the X-ray diffraction (XRD) analysis of FIG. 4(b), characteristic peaks are shown at 17.48°, 24.64°, 35.17° and 39.49°, which can confirm that the synthesized samples correspond to the characteristic peaks of $TiFe(CN)_6 \cdot 2H_2O$ (PDF#00-023-0605), rather than $Fe_4(Fe(CN)_6)_3$ (PDF#01-073-0687, peaks at 17.50°, 24.84°, 35.42° and 39.76°.

The shape of the synthesized TiFC was confirmed by SEM TEM. In FIG. 2(b), it can be confirmed that TiFC synthesized by a reaction with 0.1M FC has a spherical shape with a rough surface. In the high magnification SEM image of FIG. 2(c), it can be confirmed that the synthesized TiFC is cubic TiFC in which small nanoparticles agglomerate. In addition, the TEM image of FIG. 2(d) shows that the prepared TiFC has an empty space having a size of 500 nm, indicating that a $TiO_2$ template having a size of 500 nm melted to form a TiFC having a hollow structure (h-TiFC).

Interestingly, as shown in FIGS. 2(e), (f) and (g), it can be confirmed that TiFC reacting with 0.2M FC has a flower-shaped hierarchical structure in which two-dimensional flakes are connected to each other. In addition, the TEM image of FIG. 2(h) shows that the flower-shaped TiFC is hollow flower-like TiFC (hf-TiFC) having an empty space with a size of 500 nm. The particle size of the synthesized hf-TiFC is approximately 2 μm, which is approximately twice as large as h-TiFC having a size of approximately 1 μm, and therefore, it is expected that an adsorbent is more easily recovered in cesium adsorption. As shown in FIG. 2(g), the average thickness of the two-dimensional flakes is 26.86±4.26 nm.

Figure 5:
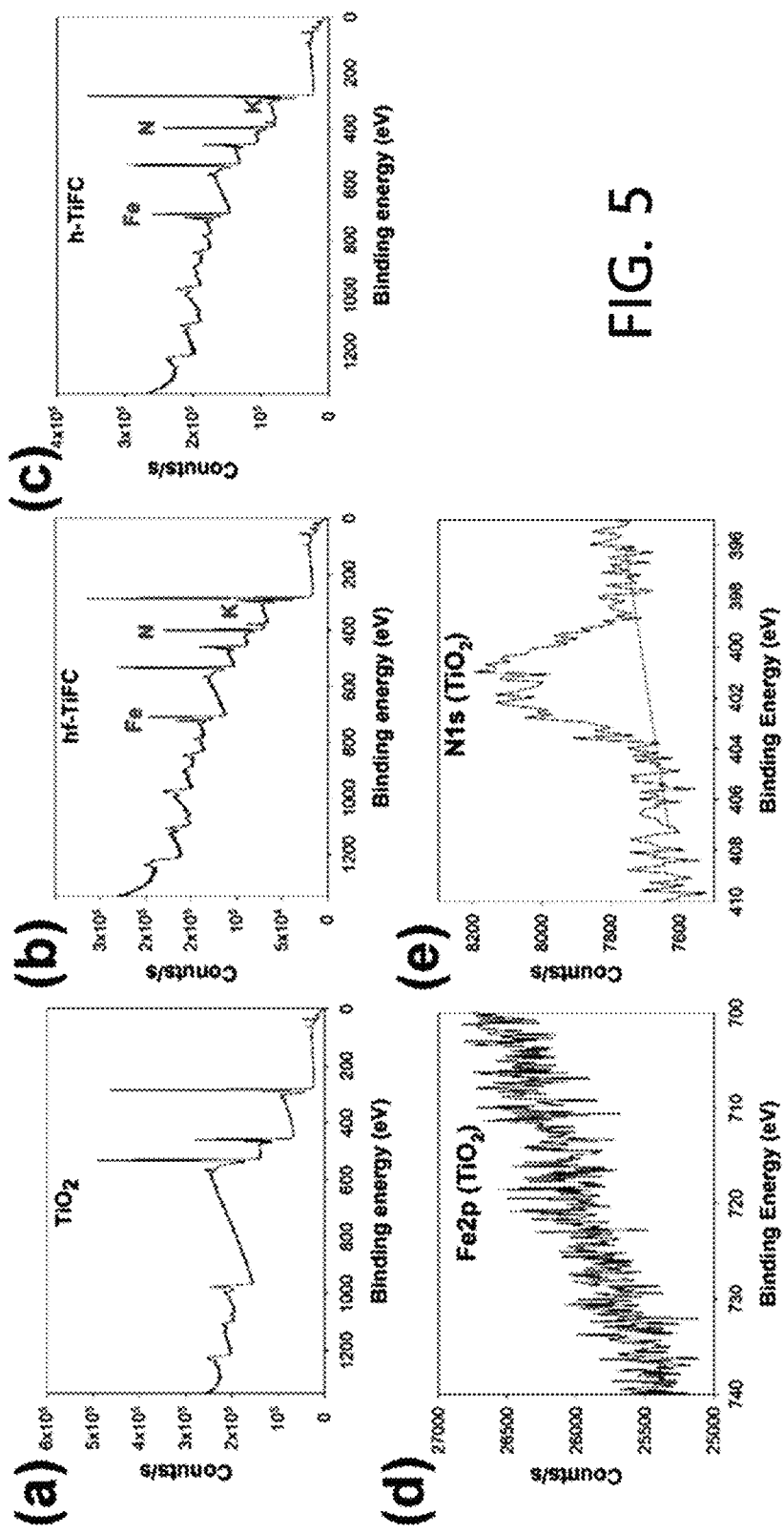
FIG. 5 shows the XPS survey graphs of (a) hydrated $TiO_2$ particles, (b) hf-TiFC and (c) h-TiFC, and the XPS spectrum graphs of (d) Fe2p and (e) N1s of the hydrated $TiO_2$ particles.

The high resolution TEM image of FIG. 2(i) shows a crystal plane, and a lattice distance is 0.3587 nm, which is the same as that of the inner-plane space on (220) planes of generally known TiFC. Therefore, it can be confirmed that the prepared material is TiFC. Unlike the XRD analysis result of h-TiFC, hf-TiFC shows a very strong intensity on (200) planes having a 2θ value of 17.5° and (400) planes having a 2θ value of 35.2°, compared with (200) planes having a 2θ value of 24.84°, indicating that the two-dimensional nano flakes of TiFC synthesized from hf-TiFC2 are mainly grown on (100) planes (FIG. 4(b)). As shown in Table 1, the calculated crystal particle sizes on (220) and (420) planes of hf-TiFC are almost the same as those of h-TiFC, whereas the crystal particle sizes on (200) and (400) planes of hf-TiFC are approximately at least twice as large as those on the same planes of h-TiFC. From the energy dispersive X-ray (EDX) spectrometer mapping image of hf-TiFC shown in FIG. 2(j), it can be confirmed that Ti, Fe, C and N elements are homogeneously distributed, indicating that the two-dimensional flakes are composed of TiFC. Moreover, the presence of K may also be confirmed, indicating that the synthesized TiFC is mainly potassium titanium ferrocyanide. According to the X-ray photoelectron spectroscopy (XPS) shown in FIGS. 5(b) and 5(c), the presence of Fe, N and K may also be confirmed, and these elements are elements that cannot be confirmed from the XPS result of $TiO_2$.

As shown in FIG. 4(c), from the N is spectra of hf-TiFC, a peak at 398.08 eV was observed, indicating N=C (cyanide group) in $Fe(CN)_6^{4-}$. In addition, FIG. 4(d) shows four different Fe2p XPS spectra, and the two major peaks at 708.41 and 721.30 eV indicate $Fe^{2+}\ 2p_{3/2}$ and $Fe^{2+}\ 2p_{1/2}$ in $Fe(CN)_6^{4-}$. In addition, the small peaks at 709.38 and 723.30 eV indicate $Fe^{3+}\ 2p_{3/2}$ and $Fe^{3+}\ 2p_{1/2}$, and the peak area ratio of $Fe^{2+}$ $2p_{3/2}$ and $Fe^{3+}$ $2p_{3/2}$ is 1 to 0.11, which is very small. The reason for the presence of $Fe^{3+}$ is probably due to unreacted $Fe(CN)_6^{4-}$ being dissociated to $Fe^{2+}$ in a reaction solution under a strong acid condition, the dissociated $Fe^{2+}$ being oxidized to $Fe^{3+}$ during a reaction time of 12 hours in air and adsorbed onto the hf-TiFC surface with a negative charge, and $Fe^{3+}$ is observed by XPS analysis.

Figure 6:
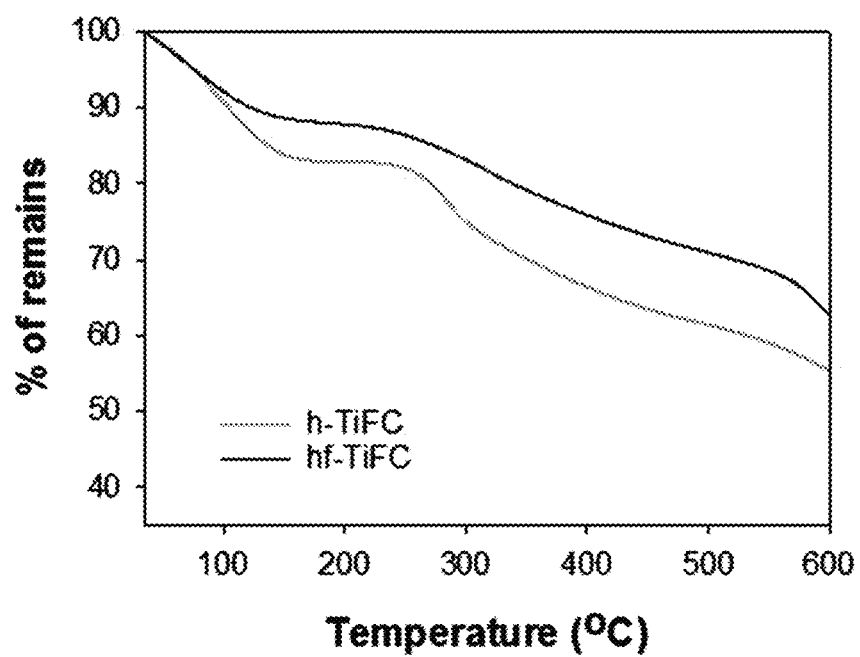
FIG. 6 is a TGA curve obtained from h-TiFC and hf-TiFC under a nitrogen atmosphere at a heating rate of $10°$ C. $min^{-1}$ up to $600°$ C.

Both of the synthesized h-TiFc and hf-TiFC were dissolved, and the wt % of Ti, Fe and K in the analyzed h-TiFC and hf-TiFC are shown in Table 1. In addition, to calculate the content of water in h-TiFc and hf-TiFC, the content of $H_2O$ calculated after TGA analysis was calculated. As shown in FIG. 6, wt % lost at 250° C. was calculated as the water content, and h-TiFC contains 17.94 wt % of water and hf-TiFC contains 13.61 wt % of water.

Provided that $TiO_2$ was completely dissolved, the chemical compositions of TiFCs calculated by the analyses of a Ti/Fe molar ratio, a K/Fe molar ratio and a water content are $K_{0.49}Ti_{1.64}Fe(CN)_{6.3}\cdot76H_2O$ for h-TiFC and $K_{0.84}Ti_{1.08}Fe(CN)_6\cdot2.59H_2O$ for hf-TiFC. The Ti/Fe ratio of Hf—TiFC is 1.08, similar to a reference material, $TiFe(CN)_6\cdot2H_2O$, in XRD analysis, but the Ti/Fe ratio of h-TiFC is 1.5 times larger than that of Hf—TiFC. This means that, among TiFCs, approximately 1.5-fold more hf-TiFC was formed than h-TiFC, which is because more TiFCs was probably formed using twice or more FC as a reactant. Based on the various analysis results described above, it was demonstrated that h-TiFC or hf-TiFC was successfully synthesized. In addition, through BET analysis, the specific surface areas of h-TiFC and hf-TiFC were analyzed, and the result is shown in Table 1. Compared with the specific surface area of $TiO_2$, which is 403 $m^2g^{-1}$, the specific surface area of h-TiFC or hf-TiFC is small, which is because, as $TiO_2$ is dissolved, larger specific surface areas disappear due to an empty space between very small nano-sized $TiO_2$ agglomerates. In addition, as expected, hf-TiFC has a larger specific surface area than h-TiFC. This is because hf-TiFC has a hierarchical structure.

TABLE 1

Compositions and specific surface areas of h-TiFC and hf-TiFC

|  | wt % of Ti | wt % of Fe | wt % of K | Chemical composition | BET surface area ($m^2/g$) |
| --- | --- | --- | --- | --- | --- |
| h-TiFC | 21.1 | 15.0 | 5.18 | $K_{0.49}Ti_{1.64}Fe(CN)_6\cdot3.76H_2O$ | 18.23 |
| hf-TiFC | 16.0 | 17.2 | 10.1 | $K_{0.84}Ti_{1.08}Fe(CN)_6\cdot2.598H_2O$ | 63.89 |

Figure 7:
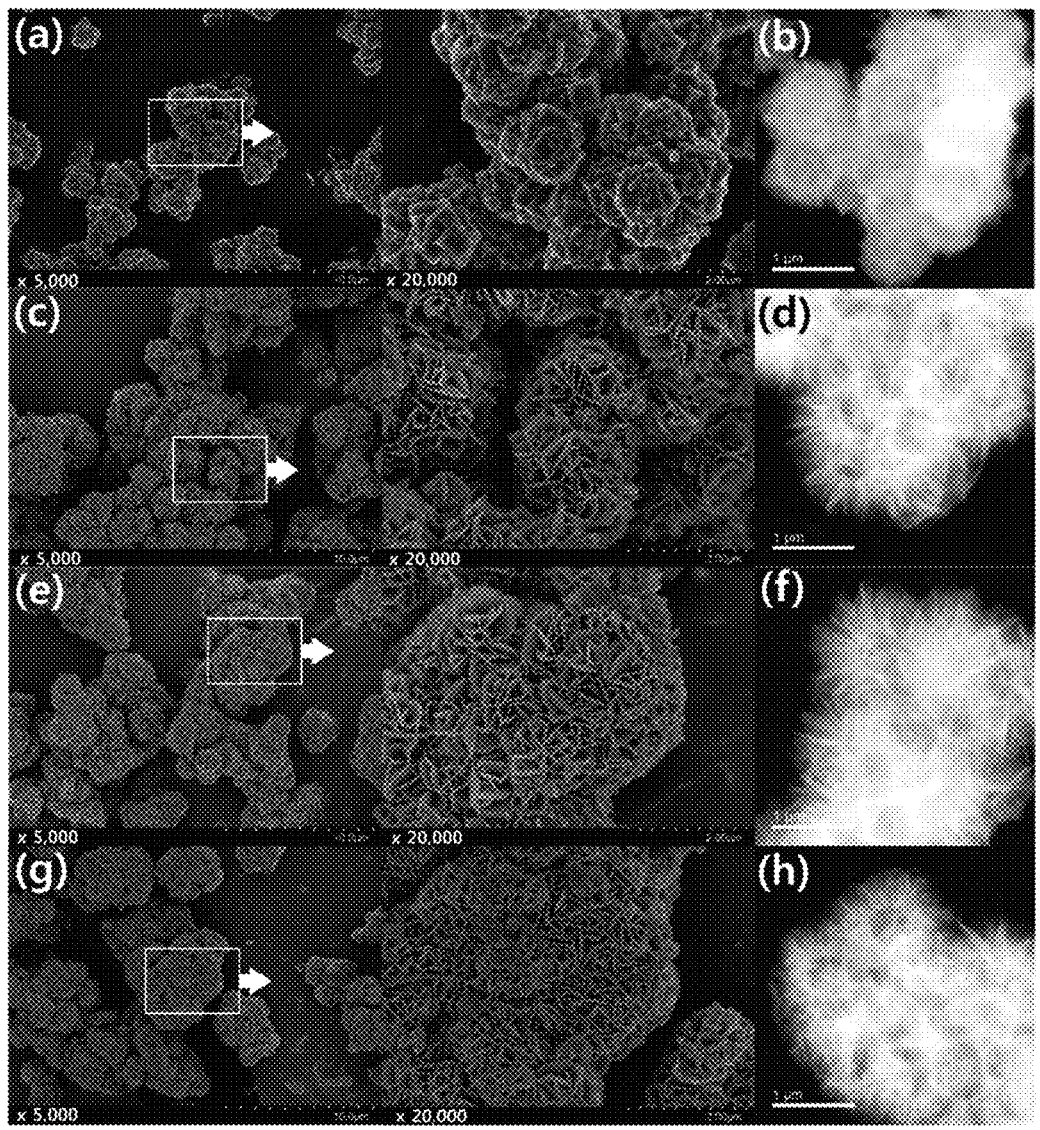
FIG. 7 shows SEM and TEM images of various TiFCs synthesized by a 12-hour reaction at a 1.5 M HCl concentration using (a, b) 0.1 M FC, (c, d) 0.2 M FC, (e, f) 0.3 MFC, and (g, h) 0.4 M FC.

Even when the concentration of FC increases up to 0.4M in a reaction, similar hf-TiFC may be obtained, as shown in FIG. 7, although the FC concentration is changed, there is no difference between the entire size of a particle and the thickness of a two-dimensional flake. However, as the FC concentration increases, it can be confirmed that the density of the two-dimensional flakes on the particle surface is higher. This is because, as the FC concentration increases, the number of two-dimensional TiFC flakes formed at the same specific time increases.

Figure 8:
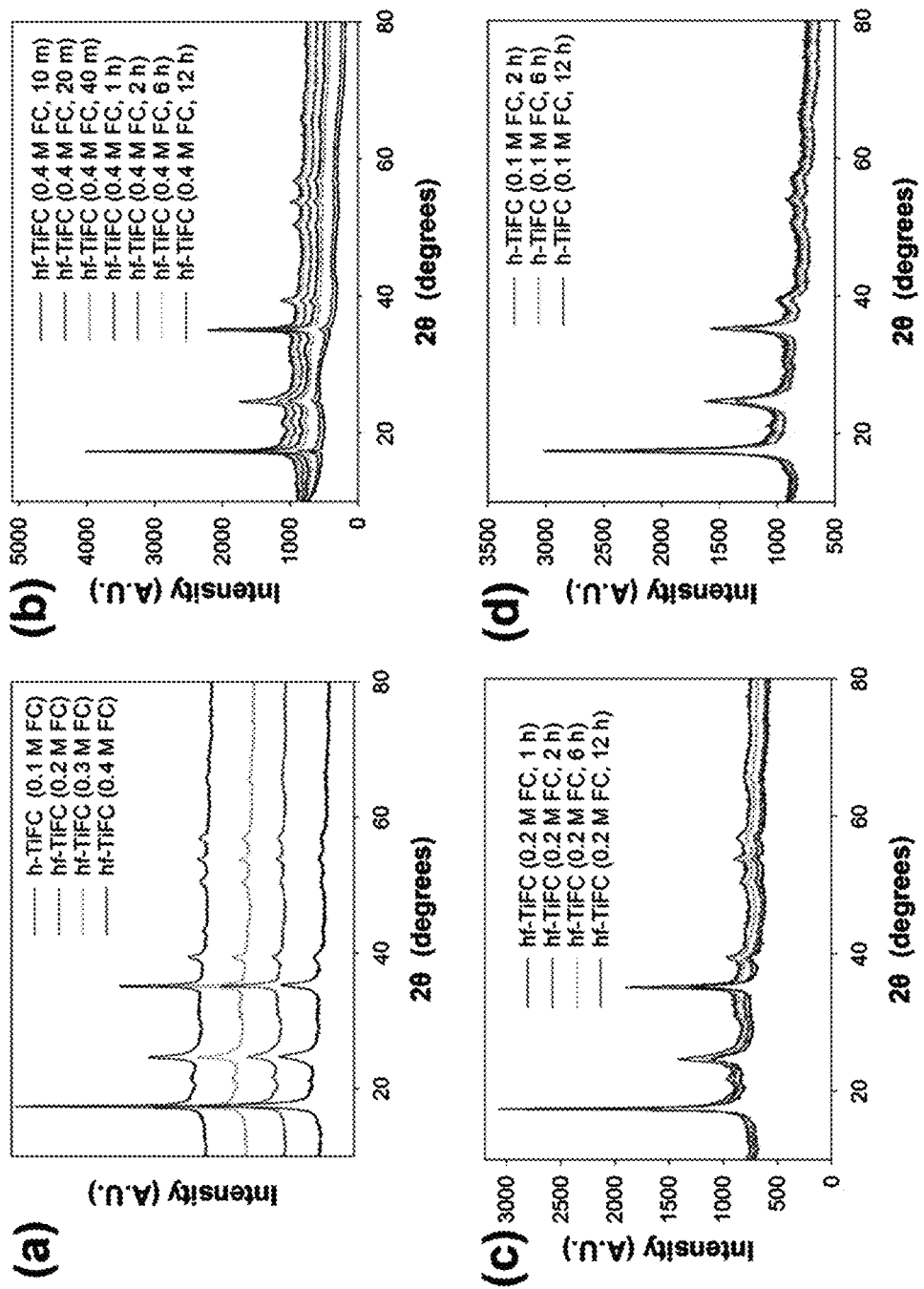
FIG. 8 is a set of XRD pattern graphs of (a) various TiFCs synthesized using 0.1, 0.2, 0.3 or 0.4 M FC in a 1.5 M HCl aqueous solution for a reaction time of 12 hours (TiFCs of FIG. 7), (b) hf-TiFCs synthesized using 0.4 M FC in a 1.5 M HCl aqueous solution for various reaction times, (c) hf-TiFCs synthesized using 0.2 M FC in a 1.5 M HCl aqueous solution for various reaction times, and (d) h-TiFC synthesized using 0.1 M FC in a 1.5 M HCl aqueous solution for various reaction times.

From the XRD analysis result of FIG. 8(a), it can be confirmed that although different amounts of FC (up to 0.4M) were used, all of the observed crystal structures are the same as $TiFe(CN)_6\cdot2H_2O$, and as the FC amount increases, the intensity of each peak in XRD increases.

To identify the mechanism of forming hf-TiFC, hf-TiFC was synthesized with 0.4M FC by time (10 minutes to 12 hours).

Figure 9:
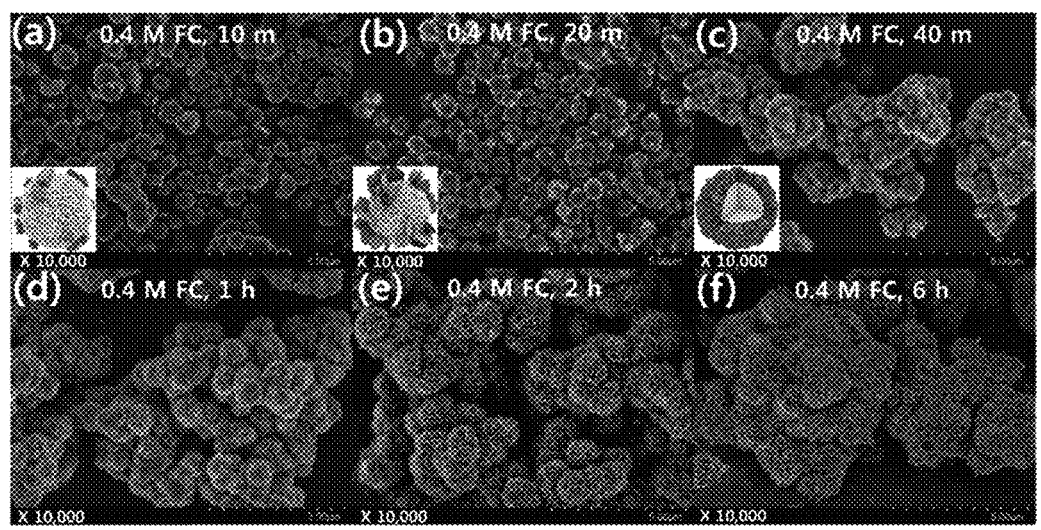
FIG. 9 shows the SEM images of hf-TiFC synthesized using 0.4 M FC in a 1.5 M HCl aqueous solution for reaction times from 10 minutes to 6 hours.

As shown in the SEM analysis result of FIG. 9(a), it can be observed that irregular particles, rather than two-dimensional flakes, are sporadically formed on the $TiO_2$ surface at a reaction time of 10 minutes. As shown in FIG. 9(b), it can be confirmed that the agglomeration of two-dimensional flakes is formed on the $TiO_2$ surface under a reaction condition of 20 minutes, indicating that the two-dimensional flake was composed of agglomerated TiFC particles. As shown in FIGS. 9(d), (e) and (f), it can be confirmed that $TiO_2$ was completely coated with the two-dimensional TiFC flakes under the condition of a reaction time of 60 minutes or more.

Figure 10:
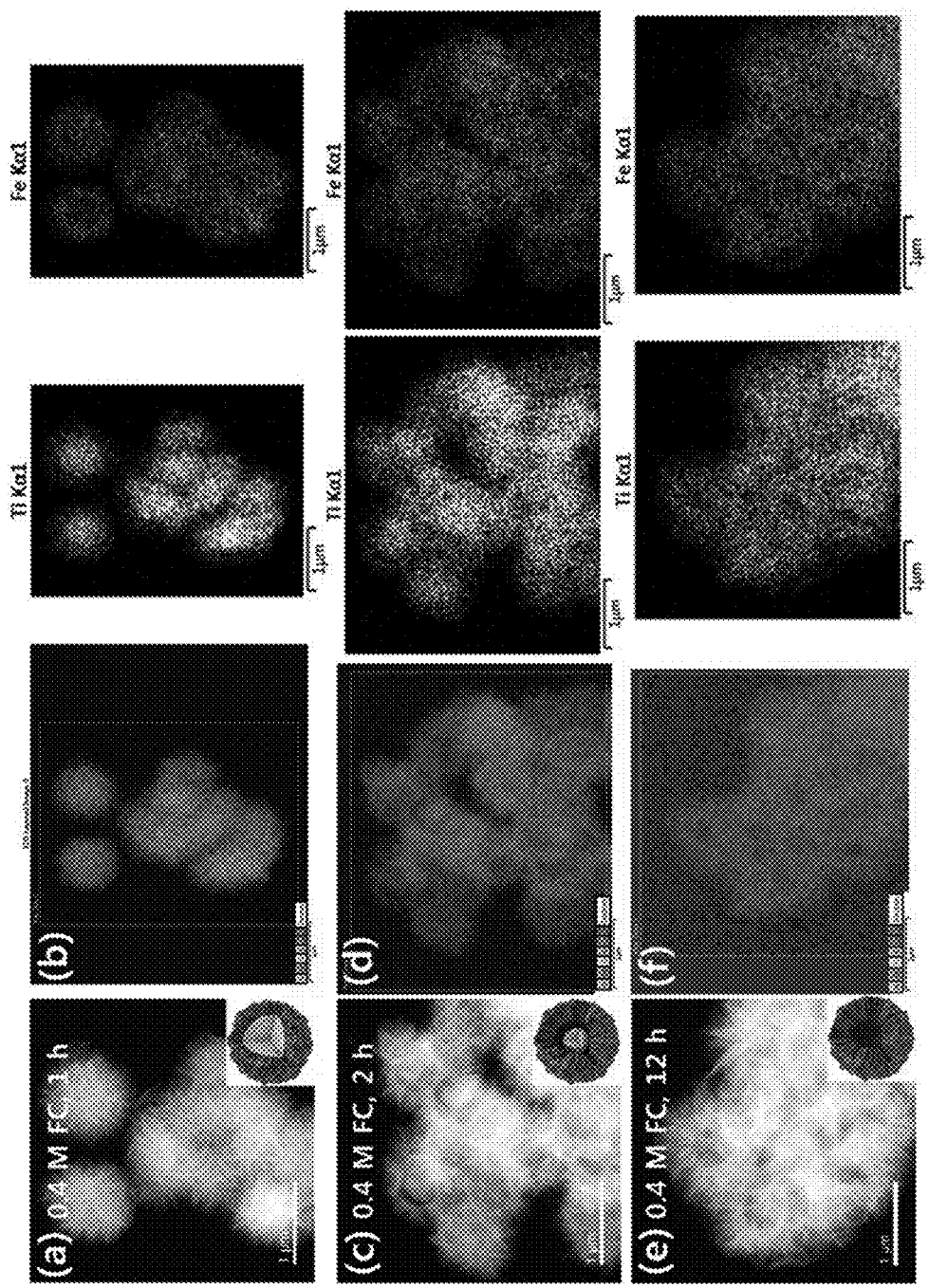
FIG. 10 shows the STEM images and EDS elemental mapping of hf-TiFC synthesized using 0.4 M FC in a 1.5 M HCl aqueous solution for a reaction time of (a, b) 1 hour, (c, d) 2 hours, and (e, f) 12 hours.
Figure 11:
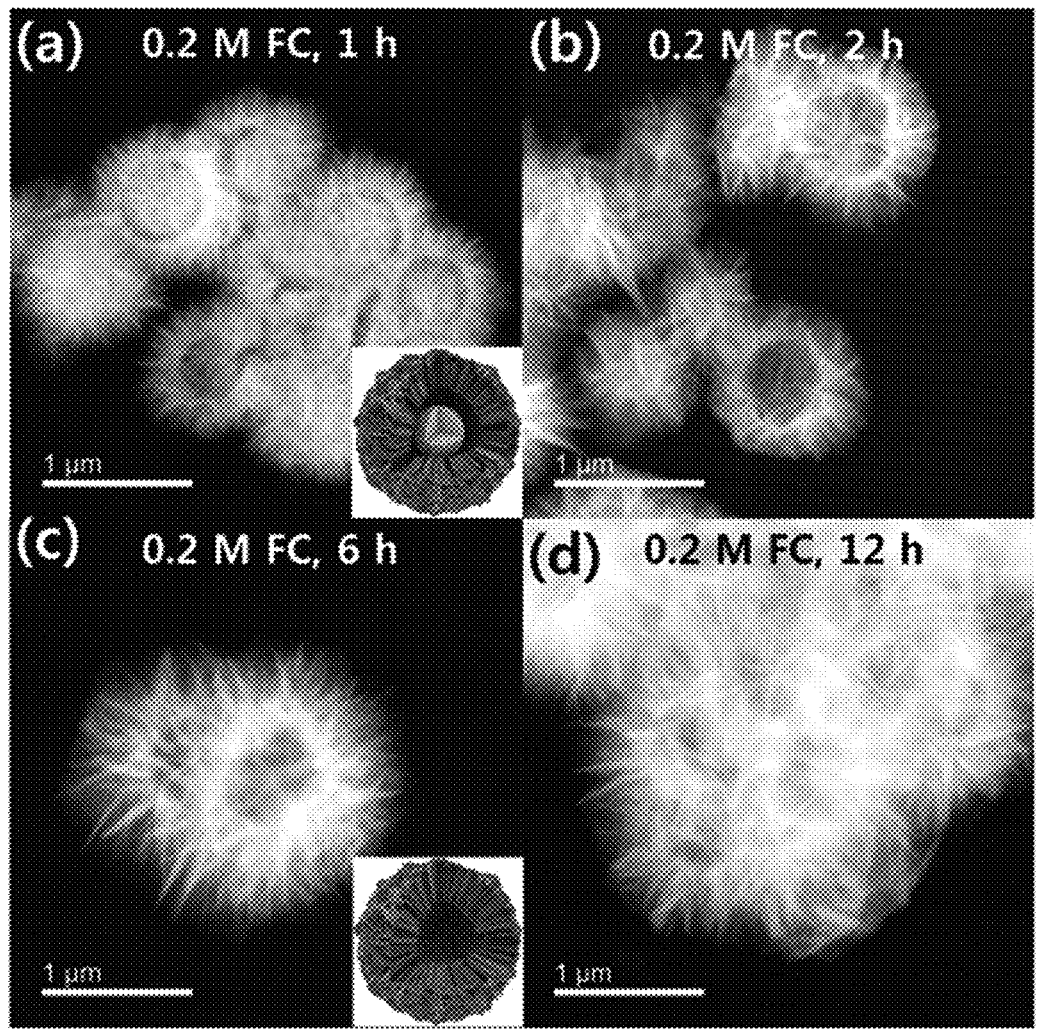
FIG. 11 shows the STEM images of hf-TiFC synthesized using 0.2 M FC in a 1.5 M HCl aqueous solution for a reaction time of (a) 1 hour, (b) 2 hours, (c) 6 hours, and (d) 12 hours.
Figure 12:
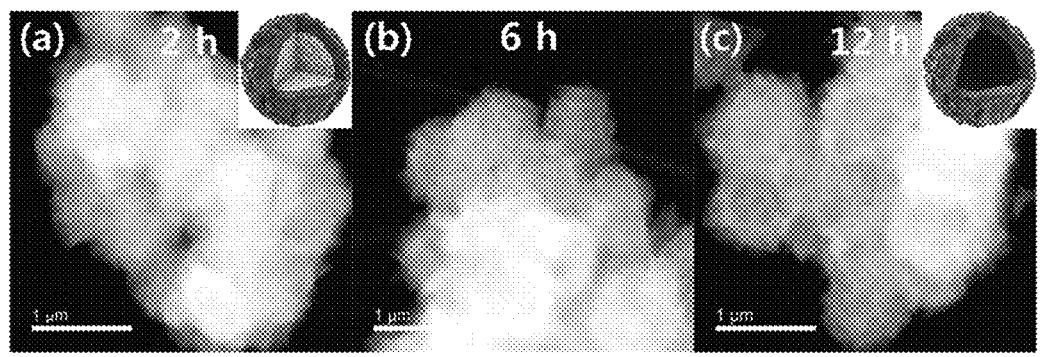
FIG. 12 shows the STEM images of h-TiFC synthesized using 0.1 M FC in a 1.5 M HCl aqueous solution for a reaction time of (a) 2 hours, (b) 6 hours, and (c) 12 hours.

Due to the limitation of SEM equipment that can analyze only a surface structure, the hollow structure of hf-TiFC was analyzed by STEM and EDX mapping. As shown in FIG. 10(a), a sample does not have a hollow structure at a reaction time of 1 hour. This indicates a $TiO_2$-core and TiFC-shell structure. As shown in FIG. 10(b), in the EDX mapping image, the Ti element is present in the shell part of the particle as a component of TiFC, but is mainly distributed in the core part of the particle as a component of $TiO_2$. On the other hand, Fe, which is the component of $[Fe(CN)_6]^{4-}$, is present in the shell part of the particle, indicating that two-dimensional TiFC flakes were successfully formed on the $TiO_2$ surface. In addition, as shown in FIG. 10(c), a $TiO_2$-yolk/TiFC-shell structure is found at a reaction time of 2 hours. In the EDX mapping of FIG. 10(d), it can also be confirmed that the Fe element is mainly present on a particle surface, and the formation of this yolk-shell structure is caused by a $TiO_2$ dissolution rate under a 1.5M HCl condition which is faster than a rate of diffusion of FC from a solution to the $TiO_2$ surface. As a result, as shown in FIGS. 10(e) and (f), as a reaction time passes, hf-TiFC has a hollow structure. FIGS. 11 and 12 show STEM images over time when the FC concentrations are reduced to 0.2M and 0.1M, respectively. In this case, the $TiO_2$-yolk/TiFC-shell structure can also be observed. As a result, a Kirkendall-type diffusion mechanism can be a main factor for forming a hollow structure of TiFC.

Figure 13:
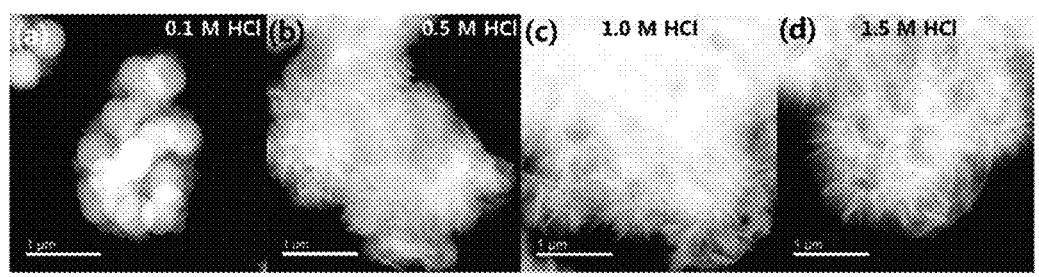
FIG. 13 shows the STEM images of TiFC synthesized using 0.2 M FC for a reaction time of 12 hours under a different acidic condition.

Subsequently, the effect of HCl concentration in the synthesis of hf-TiFC was examined. In FIG. 13, while TiFC was synthesized under the same conditions of 0.2M FC and 12 hours, and the HCl concentration in the solution was changed from 0.1, 0.5, 1 to 1.5M. Under the condition of 0.1M HCl, two-dimensional flakes were formed on the $TiO_2$ surface, and $TiO_2$ remained without being dissolved. Under the condition of 0.5 M HCl, more two-dimensional flakes were formed, but a hollow structure was not formed, and under the conditions of 1 M and 1.5 M HCl, hf-TiFC having a hollow structure began to be observed. Accordingly, a strong acidity of 1 M or more can be a major factor for synthesizing the hollow structure of hf-TiFC.

Among various hf-TiFCs, hf-TiFC prepared with 0.2 M FC at 12 hours was selected as a Cs adsorption material due to having the largest surface area. This is because the specific surface area is a factor that has the greatest effect on cesium adsorption. In addition, since the highest yield was obtained with the lowest FC concentration, the hf-TiFC prepared with the above-described conditions was selected. In addition, h-TiFC was selected as a comparative group because it has a hollow structure, but does not have a two-dimensional flake structure. First, $q_t$ values obtained under conditions of a ratio of an adsorbent to a non-radioactive cesium solution of 1 g/1 L and the initial Cs concentration, 1000 ppm, for 24 hours were compared. The measured $q_t$ of hf-TiFC and h-TiFC are 443.84 mg/g and 281.28 mg/g, respectively. As shown in Table 2, the difference between both $q_t$ values is mainly because hf-TiFC has a specific surface area 3.5 times larger than h-TiFC. In addition, as shown in the EDX mapping image of FIG. 14, it can be confirmed that the adsorbed Cs is uniformly dispersed in TiFC without a change in TiFC structure. From the above result, it was confirmed that hf-TiFC can be adsorbed onto Cs well. Table 2 shows $q_t$ values of bare $TiO_2$, commercial Prussian blue (PB, $Fe_4(Fe(CN)_6)_3$, Sigma-Aldrich Ltd.), g-TiFC (FIG. 15), protonated CST (HCST, FIG. 16) and CHA (chabazite, zeolite for Cs removal, FIG. 17) under the same experimental conditions. Their values are 101, 60, 151, 205 and 368 mg/g, respectively. Here, the protonated CST (HCST) is known to generally have a better Cs adsorption property than Na-CST, and thus HCST was selected as a representative group of CST, instead of Na-CST. The bare $TiO_2$ has a higher $q_t$ value than commercial PB, which is because $TiO_2$ itself has a negative charge, and the specific surface area of the bare $TiO_2$ is very high at 403.01 m$^2$/g. As shown in Table 3, hf-TiFC has a higher $q_t$ value than conventional Cs adsorbents such as HCST and CHA.

TABLE 2

$q_{t=24\,h}$ values of various adsorbents at contact time of 24 hours

| | $TiO_2$ | Commercial Prussian blue (Sigma Aldrich, 234125) | g-TiFC | HCST | CHA |
|---|---|---|---|---|---|
| $q_e$ (mgCs/g adsorbent) | 101.4 | 60.48 | 151.04 | 205.28 | 368.16 |

Figure 14:
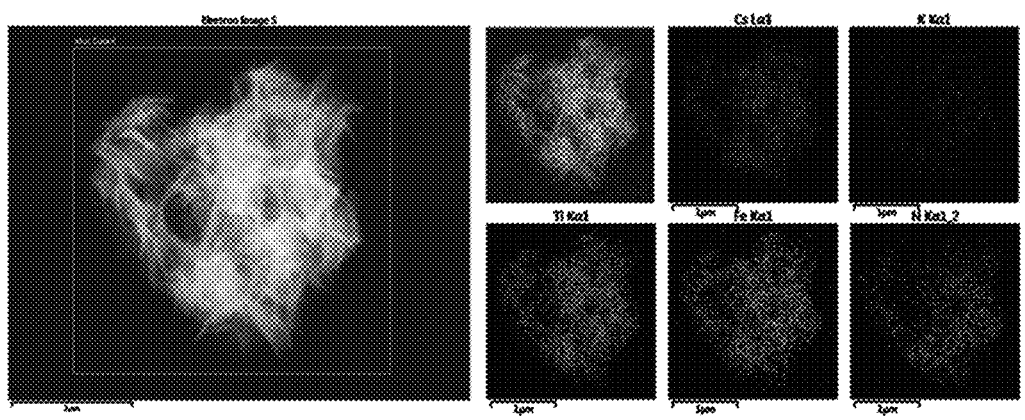
FIG. 14 shows the STEM images and EDS elemental mapping of hf-TiFC after Cs adsorption.
Figure 15:
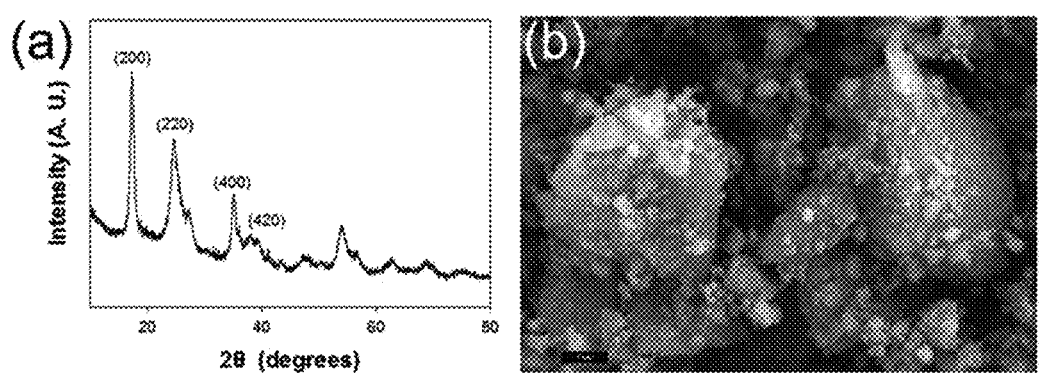
FIG. 15 shows the (a) XRD pattern graph and (b) SEM image of g-TiFC synthesized by a reaction between $TiCl_4$ and potassium ferrocyanide.
Figure 18:
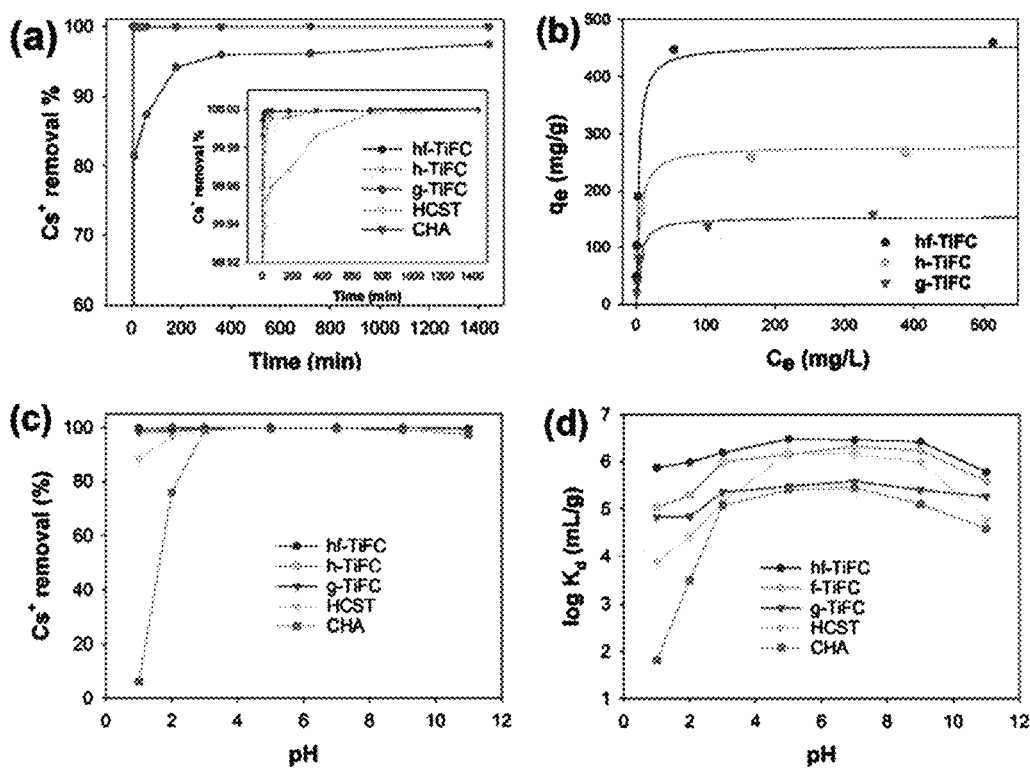
FIG. 18 shows the (a) kinetics data and (b) isotherm graph for Cs adsorption of various Cs adsorbents including h-TiFC, hf-TiFC and g-TiFC, and the graphs indicating the effect of pH on Cs adsorption performance in terms of the (c) removal efficiencies and (d) $K_d$ values of various Cs adsorbents including h-TiFC, hf-TiFC and g-TiFC.

Cs adsorption kinetics for hf-TiFC, h-TiFC, g-TiFC, HCST and CHA were compared and evaluated. FIG. 18(a) shows Cs removal efficiencies per time for respective adsorbents. All adsorbents, except g-TiFC, showed a very excellent adsorption rate such that 99.92% of Cs is removed within an adsorption time of 5 minutes (the initial concentration of Cs is 68 ppm). In the case of g-TiFC, for adsorption equilibrium, a time of 24 hours or more is needed. Generally, the transition metal-ferrocyanide prepared by precipitation, such as g-TiFC, is decreased in intracrystalline diffusion of Cs due to the structural limitation of a secondary particle composed of an agglomerate of TiFC crystal particles, and thus has slow kinetics. As shown in FIG. 14, the secondary particle of g-TiFC has a size of 3 to 5 μm. Since hf-TiFC having a size of ~2 μm and h-TiFC having a size of ~1 μm have hollow structures, there is no disadvantage caused by the decreased intracrystalline diffusion, which is the disadvantage of g-TiFC. Therefore, hf-TiFC and h-TiFC have very excellent adsorption kinetics for cesium as compared with various MFCs prepared by precipitation such as g-TiFC.

To be compared with other adsorbents having a high adsorption rate, the adsorption results of FIG. 18(a) were analyzed using a pseudo second-order model (Table 3). All of the $R^2$ values are 1, indicating that an adsorption rate is well matched with the pseudo second-order kinetics, and a rate-limiting step is chemical adsorption. Surprisingly, the $k_2$ value of hf-TiFC is approximately 11,100 times higher than g-TiFC, which is thought to be due to a morphological effect. Moreover, the $K_2$ value of hf-TiFC is 5.3 times higher than h-TiFC. This is because, compared with h-TiFC composed of TiFC in which three-dimensional nano polyhedrons agglomerate, hf-TiFC composed of TiFC in which two-dimensional nano flakes overlap is advantageous for the intracrystalline diffusion of Cs. Particularly, although the surface area of hf-TiFC is 63.89 m$^2$/g lower than that of CHA, that is, 749.12 m$^2$/g, hf-TiFC has a $K_2$ value 31.8 times and 1.57 times higher than HCST and CHA. Therefore, compared with a conventional Cs adsorbent, hf-TiFC has a very excellent adsorption rate for Cs, which is very advantageous for application to actual Cs removal.

TABLE 3

Pseudo second-order kinetics for Cs adsorption of h-TiFC, hf-TiFC, g-TiFC, HCST and CHA

| | h-TiFC | hf-TiFC | g-TiFC | HCST | CHA |
|---|---|---|---|---|---|
| $q_e$(mg/g) | 68.49 | 68.49 | 66.95 | 68.49 | 68.49 |
| $K_2$(gmg$^{-1}$min$^{-1}$) | 4.23 | 22.6 | 0.00203 | 0.711 | 14.4 |

The results of a Cs adsorption isotherm test for hf-TiFC, h-TiFC and g-TiFC are shown in FIG. 18(b). Isotherm data was applied to a Langmur model (the trend line in FIG. 18(b)), and the fitting result is shown in Table 4. All $R^2$ values are 0.99 or more, indicating that Cs adsorption is monolayer adsorption. The maximum adsorption amount ($q_{max}$) of hf-TiFC is 454.54 mg/g, which is 1.64-fold that of h-TiFC and due to an increased effective surface area. All of the $q_{max}$ values of hf-TiFC and h-TiFC are higher than g-TiFC, which is because g-TiFC has lower accessibility to Cs. In addition, since g-TiFC does not have a hollow structure, it has a lower $q_{max}$ than hf-TiFC and h-TiFC. To compare the $q_{max}$ value of hf-TiFC with other adsorbents, the currently reported $q_{max}$ values of clay, commercial CST, commercial metal-ferrocyanide and various zeolites are shown in Table 5. As shown in Table 5, hf-TiFC has better Cs adsorption capacity, compared with all of the other adsorbents such as commercial CST (266 mg/g UOP) and commercial MFC, that is, CsTreat® (48 mg/g, $K_2CoFe(CN)_6$, Fortum, Finland), which are widely used as Cs adsorbents.

TABLE 4

Langmur fitting results of Cs adsorption isotherms of hf-TiFc, h-TiFC and g-TiFC

| | hf-TiFC | h-TiFC | g-TiFC |
|---|---|---|---|
| $q_{max}$(mgg$^{-1}$) | 454.54 | 277.78 | 153.85 |
| b (kg mg$^{-1}$) | 0.3235 | 0.2093 | 0.1952 |
| $R^2$ | 0.998 | 0.998 | 0.996 |

TABLE 5

Comparison of maximum adsorption capacity ($q_{max}$) by various inorganic adsorbents

| | $q_{max}$ (mg/g) |
|---|---|
| Commercial CST (UOP)[a] | 266 |
| CsTreat ® ($K_2CoFe(CN)_6$, commercial metalferrocyanide, Fortum, Finland)[b] | 48 |
| Hollow Prussian blue nanoparticle (190 nm)[c] | 131 |
| Bentonite[d] | 126.4 |
| Montmorillonite[d] | 37.2 |
| Natural clinoptilolite[e] | 168.9 |
| Natural chabazite[e] | 275.3 |
| Synthetic chabazite[e] | 428 |
| Natural mordenite[e] | 256.7 |
| Na-mordenite (MOR) (CBV 10A, Zeolyst International)[f] | 222.1 |

TABLE 5-continued

Comparison of maximum adsorption capacity ($q_{max}$) by various inorganic adsorbents

| | $q_{max}$ (mg/g) |
|---|---|
| Commercial NaA (Molecular Sieve 4A, Aldrich)[e] | 289 |
| Commercial NaX (Molecular Sieve 13X, Aldrich)[e] | 308 |

[a]Chitra, S.; Viswanathan, S.; Rao, S. V. S.; Sinha, P. K. Uptake of Cesium and Strontium by Crystalline Silicotitanates from Radioactive Wastes. *J. Radioanal. Nucl. Chem.* 2011, 287, 955-960.
[b]Ali, I. M.; Zakaria, E. S.; Aly, H. F. Highly Effective Removal of 22Na, 134Cs and 60Co from Aqueous Solutions by Titanosilicate: A Radiotracer Study. *J. Radioanal. Nucl. Chem.* 2010, 295, 483-489.
[c]Torad, N. L.; Hu, M.; Imura, M.; Naito, M.; Yamauchi, Y. Large Cs Adsorption Capability of Nanostructured Prussian Blue Particles with High Accessible Surface Areas. *J. Mater. Chem.* 2012, 22, 18261-18267.
[d]Galambos, M.; Paucova, V.; Kufcakova, J.; Rosskopfova, O.; Rajec, P.; Adamcova, R. *J. Radioanal. Nucl. Chem.* 2010, 284, 55-64
[e]Borai, E. H.; Harjula, R.; Malinen, L.; Paajanen, A. *J. Hazard. Mater.* 2009, 172, 416-422.
[f]Han, E.; Kim, Y.-G.; Yang, H.-M.; Yoon, I.-H.; Choi, M. *Chem. Mater.* 2018, 30, 5777-5785.

In the Cs adsorption test for Hf—TiFC, h-TiFC, g-TiFC, HCST and CHA, the effect of pH was evaluated. As shown in FIGS. 18(c) and (d) and Table 6, hf-TiFC and h-TiFC showed 99% or higher removal efficiencies in all pH ranges from pH 1 to 11. However, CHA and HCST removal efficiencies were reduced to about 7.73% and about 88.63% at pH 1, respectively, which is because CHA is dissolved under a strong acid condition, and HCST is decreased in removal efficiency since excessive $H^+$ acts as a competing ion of Cs. However, the $K_d$ value of hf-TiFC is best in all ranges of pH, and particularly, the $K_d$ values of hf-TiFC at pH 1 and 11 are 96 times (pH 1) or 10 times (pH 11) higher than the best existing adsorbent, HCST. From the above results, hf-TiFC can be a better adsorbent at various pHs, compared with all adsorbents.

TABLE 6

Cs removal efficiencies and Kd values for hf-TiFC, HCST and CHA in various pH ranges from pH 1 to 11 (the concentration of initial Cs was 50 ppm, and a ratio between the mass of the adsorbent and the volume of the Cs solution was fixed at m/V = 1 g/L)

| | pH | | | | | | |
|---|---|---|---|---|---|---|---|
| | 1 | 2 | 3 | 5 | 7 | 9 | 11 |
| hf-TiFC | | | | | | | |
| Cs removal efficiency (%) | 99.85808 | 99.90078 | 99.94294 | 99.96419 | 99.96751 | 99.95532 | 99.83044 |
| Standard deviation | 0.00987 | 0.00272 | 0.00357 | 0.00380 | 0.00244 | 0.00855 | 0.02981 |
| $K_d$ (mL/g) | $7.058 \times 10^5$ | $1.007 \times 10^6$ | $1.756 \times 10^6$ | $2.811 \times 10^6$ | $3.089 \times 10^6$ | $2.289 \times 10^6$ | $6.009 \times 10^5$ |
| Standard deviation | $4.752 \times 10^4$ | $2.724 \times 10^4$ | $1.139 \times 10^5$ | $2.839 \times 10^5$ | $2.388 \times 10^5$ | $4.123 \times 10^5$ | $1.038 \times 10^5$ |
| HCST | | | | | | | |
| Cs removal efficiency (%) | 88.63212 | 95.91482 | 99.29469 | 99.92900 | 99.93171 | 99.89442 | 98.48632 |
| Standard deviation | 0.64513 | 0.92736 | 0.03705 | 0.00608 | 0.00266 | 0.00357 | 0.11405 |
| $K_d$ (mL/g) | $7.816 \times 10^3$ | $2.426 \times 10^4$ | $1.410 \times 10^5$ | $1.414 \times 10^6$ | $1.465 \times 10^6$ | $9.469 \times 10^5$ | $6.531 \times 10^4$ |
| Standard deviation | $5.106 \times 10^2$ | $5.141 \times 10^3$ | $7.515 \times 10^3$ | $1.202 \times 10^5$ | $5.814 \times 10^4$ | $3.151 \times 10^4$ | $4.825 \times 10^3$ |
| CHA | | | | | | | |
| Cs removal efficiency (%) | 7.73306 | 76.05064 | 99.13212 | 99.55292 | 99.65967 | 99.20628 | 97.45221 |
| Standard deviation | 2.86505 | 2.17841 | 0.04158 | 0.05815 | 0.00980 | 0.06109 | 0.02534 |
| $K_d$ (mL/g) | $8.452 \times 10^1$ | $3.198 \times 10^3$ | $1.144 \times 10^5$ | $2.252 \times 10^5$ | $2.930 \times 10^5$ | $1.255 \times 10^5$ | $3.825 \times 10^4$ |
| Standard deviation | $3.429 \times 10^1$ | $3.866 \times 10^2$ | $5.468 \times 10^3$ | $2.899 \times 10^4$ | $8.499 \times 10^3$ | $9.576 \times 10^3$ | $3.916 \times 10^2$ |

Figure 19:
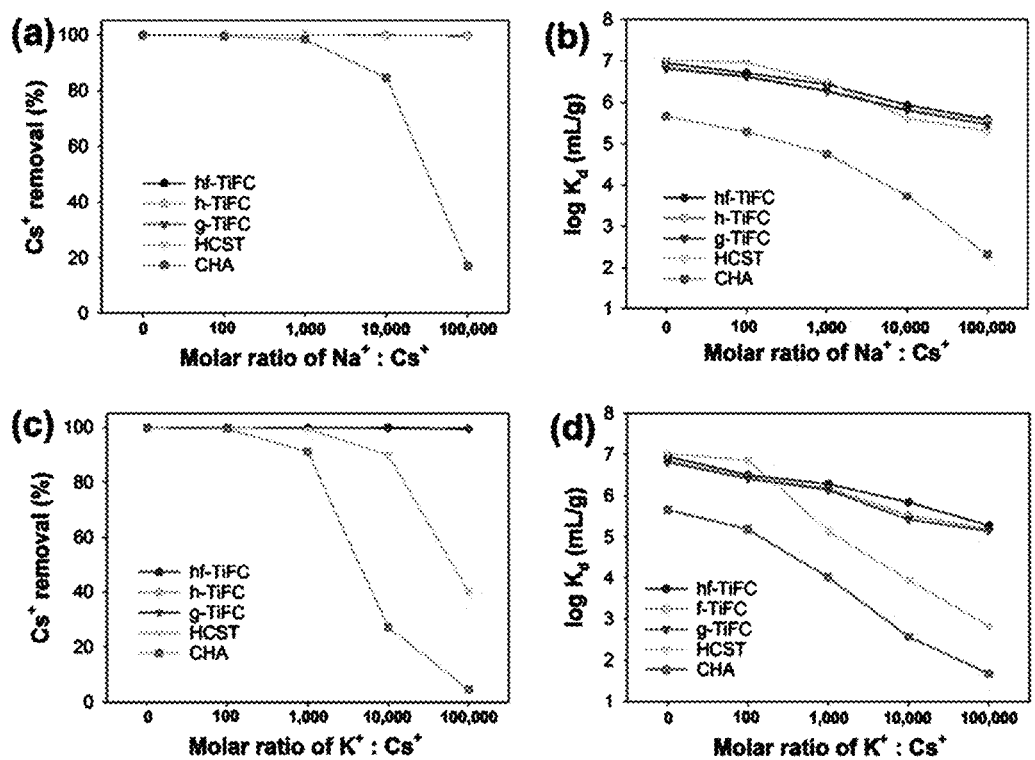
FIG. 19 shows the graphs indicating the effects of competing ions such as (a, b) Na and (c, d) K on Cs adsorption performance in terms of the removal efficiencies and $K_d$ values of h-TiFC, hf-TiFC, g-TiFC, HCST and CHA.

The effects of $Na^+$ and $K^+$ excessively present in seawater or radioactive liquid waste were evaluated. FIG. 19 and Table 7 show Cs removal efficiencies according to molar ratios of $Na^+$ or $K^+$ to $Cs^+$, and Kd values. The experiment was performed with molar ratios up to 100,000, and the initial Cs concentration was 0.79 ppm. As shown in FIGS. 19(a) and (b), CHA has an excellent $q_{max}$ value of 428 mg/g (see Table 5), but when excessive Na is present, it shows very poor selectivity. Unlike CHA, even at the Na/Cs molar ratio of 100,000, hf-TiFC, h-TiFC, g-TiFC and HCST have removal efficiencies of 99.5% or more and $K_d$ values of $2.05 \times 10^5$ mL/g or more. However, the $K_d$ values of hf-TiFC, h-TiFC and g-TiFC are higher than that of HCST when the $Na^+:Cs^+$ ratio is 10000 or more. This means that TiFC basically has better cesium selectivity than CST. Moreover, the $K_d$ value of hf-TiFC is highest, which is slightly higher than that of hf-TiFC or g-TiFC, indicating that, even in the presence of Na, hf-TiFC has the highest cesium selectivity. The difference between TiFCs results from, as seen from the XRD results of FIG. 4(b), hf-TiFC having higher crystallinity than h-TiFc and g-TiFC.

The $K_d$ value of Hf—TiFC is 14, 79 and 286 times higher than that of HCST when the K/Cs molar ratios are 1000, 10000 and 100000, respectively. The reason why the Kd value of HSCT rapidly decreases when there is $K^+$ rather than $Na^+$ is that the hydrated radius of $K^+$ (3.3 Å) is more similar to the hydrated radius of Cs (3.25 Å), compared with the hydrated radius of $Na^+$ (3.6 Å). Therefore, $K^+$ acts as a more threatening competing ion for $Cs^+$ than for $Na^+$. For the same reason as described above, all of the TiFCs including hf-TiFC also have lower $k_d$ values than that when $K^+$, rather than $Na^+$ is present as a competing ion. Based on these analysis results, hf-TiFC has better cesium selectivity than other Cs adsorbents, particularly, HCST and CHA.

For a more realistic experiment, actual radioactive cesium was used. Radioactive cesium ($^{137}CS$)-containing simulated seawater (10000 ppm $Na^+$, 1500 ppm $Mg^{2+}$, and 500 ppm each of $Ca^{2+}$ and $K^+$) and acidic simulated radioactive liquid waste (5.7 M $Na^+$ and pH 1) were prepared. The radioactive levels of the radioactive cesium-containing simulated seawater and the simulated radioactive liquid waste were 109.03 and 117.89 Bq/g, respectively. The above values are

TABLE 7

Cs removal efficiencies and $K_d$ values for hf-TiFC, h-TiFC, g-TiFC, HCST and CHA at various molar ratios of $Na^+$ or $K^+$ to $Cs^+$ (the initial Cs concentration was 0.79 ppm, and a ratio between the mass of an absorbent and the volume of a Cs solution was fixed at m/V = 1 g/L)

| $Na^+$ or $K^+$:$Cs^+$ molar ratio | 0 | 10,000 ($Na^+$:$Cs^+$) | 100,000 ($Na^+$:$Cs^+$) | 10,000 ($K^+$:$Cs^+$) | 100,000 ($K^+$:$Cs^+$) |
|---|---|---|---|---|---|
| hf-TiFC | | | | | |
| Cs removal efficiency (%) | 99.98622 | 99.87587 | 99.71410 | 99.75609 | 99.48448 |
| Standard deviation | 0.00266 | 0.01300 | 0.02876 | 0.03936 | 0.00837 |
| $K_d$ (mL/g) | $7.440 \times 10^6$ | $8.102 \times 10^5$ | $3.512 \times 10^5$ | $4.170 \times 10^5$ | $1.930 \times 10^5$ |
| Standard deviation | $1.452 \times 10^6$ | $8.011 \times 10^4$ | $3.646 \times 10^4$ | $7.418 \times 10^4$ | $3.173 \times 10^3$ |
| h-TiFC | | | | | |
| Cs removal efficiency (%) | 99.98398 | 99.85807 | 99.67288 | 99.70134 | 99.41941 |
| Standard deviation | 0.00309 | 0.02086 | 0.05763 | 0.03995 | 0.05648 |
| $K_d$ (mL/g) | $6.385 \times 10^6$ | $7.147 \times 10^5$ | $3.110 \times 10^5$ | $3.379 \times 10^5$ | $1.723 \times 10^5$ |
| Standard deviation | $1.132 \times 10^6$ | $1.138 \times 10^5$ | $5.394 \times 10^4$ | $4.572 \times 10^4$ | $1.602 \times 10^4$ |
| g-TiFC | | | | | |
| Cs removal efficiency (%) | 99.97907 | 99.81558 | 99.63513 | 99.67364 | 99.28645 |
| Standard deviation | 0.00486 | 0.03309 | 0.02109 | 0.04391 | 0.00737 |
| $K_d$ (mL/g) | $4.983 \times 10^6$ | $5.523 \times 10^5$ | $2.737 \times 10^5$ | $3.090 \times 10^5$ | $1.392 \times 10^5$ |
| Standard deviation | $1.330 \times 10^6$ | $9.237 \times 10^4$ | $1.609 \times 10^4$ | $3.973 \times 10^4$ | $1.442 \times 10^4$ |
| HCST | | | | | |
| Cs removal efficiency (%) | 99.98858 | 99.77647 | 99.52993 | 90.37798 | 42.42347 |
| Standard deviation | 0.00233 | 0.02489 | 0.05460 | 0.69240 | 2.70644 |
| $K_d$ (mL/g) | $8.995 \times 10^6$ | $4.503 \times 10^5$ | $2.138 \times 10^5$ | $9.678 \times 10^3$ | $7.394 \times 10^2$ |
| Standard deviation | $1.750 \times 10^6$ | $5.274 \times 10^4$ | $2.617 \times 10^4$ | $6.940 \times 10^2$ | $8.281 \times 10$ |
| CHA | | | | | |
| Cs removal efficiency (%) | 99.79236 | 82.61373 | 16.87807 | 29.37595 | 6.26586 |
| Standard deviation | 0.02599 | 2.96465 | 1.79114 | 3.29128 | 2.54716 |
| $K_d$ (mL/g) | $4.860 \times 10^5$ | $4.855 \times 10^3$ | $2.034 \times 10^2$ | $4.181 \times 10^2$ | $5.620 \times 10$ |
| Standard deviation | $6.470 \times 10^4$ | $9.112 \times 10^2$ | $2.581 \times 10$ | $6.783 \times 10$ | $2.805 \times 10$ |

Interestingly, when $K^+$, as a competing ion, is present in an amount 1000 times or more larger than Cs, the differences in Cs removal efficiency and $K_d$ value between various TiFCs and HCST are larger than those when the $Na^+$ is present as a competing ion (FIGS. 19(c) and (d)). As expected, hf-TiFC has a higher $K_d$ value than other TiFCs even when $K^+$ is present as a competing ion. This is considered to be due to high crystallinity as described above.

converted into chemical concentrations of approximately 34.072 ppt and 36.841 ppt, respectively. As shown in Table 8, hf-TiFC shows the best removal efficiency of more than 99.07%. This shows a very excellent selectivity for radioactive cesium. Particularly, HCST shows a low removal efficiency of 78.93% in simulated seawater, and a low removal efficiency of 81.33% in radioactive simulated liquid waste. These results tend to be consistent with the above-described experimental results with non-radioactive cesium. Further, after removal of the hf-TiFC-treated simulated seawater and simulated radioactive liquid waste, the DF values are 110 and 690, respectively, indicating that the decontamination factor (DF) values are very high although a very small amount, that is, 0.1 mg/mL, of the adsorbent was used. This result means that hf-TiFC has very excellent applicability, and the high applicability in treating seawater contaminated in an actual nuclear accident or various types of radioactive cesium liquid waste generated in operation or dismantlement of nuclear facilities.

TABLE 8

Cs removal efficiencies and decontamination factors in simulated seawater or acidic simulated radioactive liquid waste by hf-TiFC, h-TiFC, g-TiFC, HCST and CHA

| | Adsorbent | $A_f$(Bq/mL) | Cs removal efficiency (%) | DF ($A_o/A_f$) |
|---|---|---|---|---|
| Simulated seawater ($A_o$ = 109.03 Bq/g) | hf-TiFC | 0.96 | 99.12 | 113.57 |
| | h-TiFC | 1.99 | 98.17 | 54.79 |
| | g-TiFC | 2.81 | 97.42 | 38.80 |
| | HCST | 22.97 | 78.93 | 4.75 |
| | CHA | 87.98 | 19.31 | 1.24 |
| Acidic simulated radioactive liquid waste with 5.7M Na$^+$ and pH 1 ($A_0$ = 117.89 Bq/g) | hf-TiFC | 0.17 | 99.86 | 693.47 |
| | h-TiFC | 0.69 | 99.41 | 170.86 |
| | g-TiFC | 1.04 | 99.12 | 113.36 |
| | HCST | 22.01 | 81.33 | 5.36 |
| | CHA | 113.20 | 3.98 | 1.04 |

($A_o$: initial activity;
$A_f$: final activity after treatment)

The inventors reported a novel method of preparing hf-TiFC by a simple reaction between FC and TiO$_2$ as a Ti source under an acidic condition to effectively remove radioactive Cs in water. It was confirmed that two-dimensional TiFC flakes were produced at a higher FC concentration than 0.2 M, and acidity is a main factor for forming a hollow structure, indicating a Kirkendall-type diffusion mechanism. Compared with g-TiFC, the Cs adsorption property of hf-TiFC was significantly improved, and among various Cs adsorbents including CHA and CST, hf-TiFC had the best adsorption kinetics, capacity and selectivity. The excellent removal efficiency of $^{137}$Cs from 5.7 M salt-containing seawater and acidic nuclear liquid waste exceeds 99.1%, showing that hf-TiFC has excellent potential in treating various $^{137}$Cs-contaminated water sources.

Figure 20:
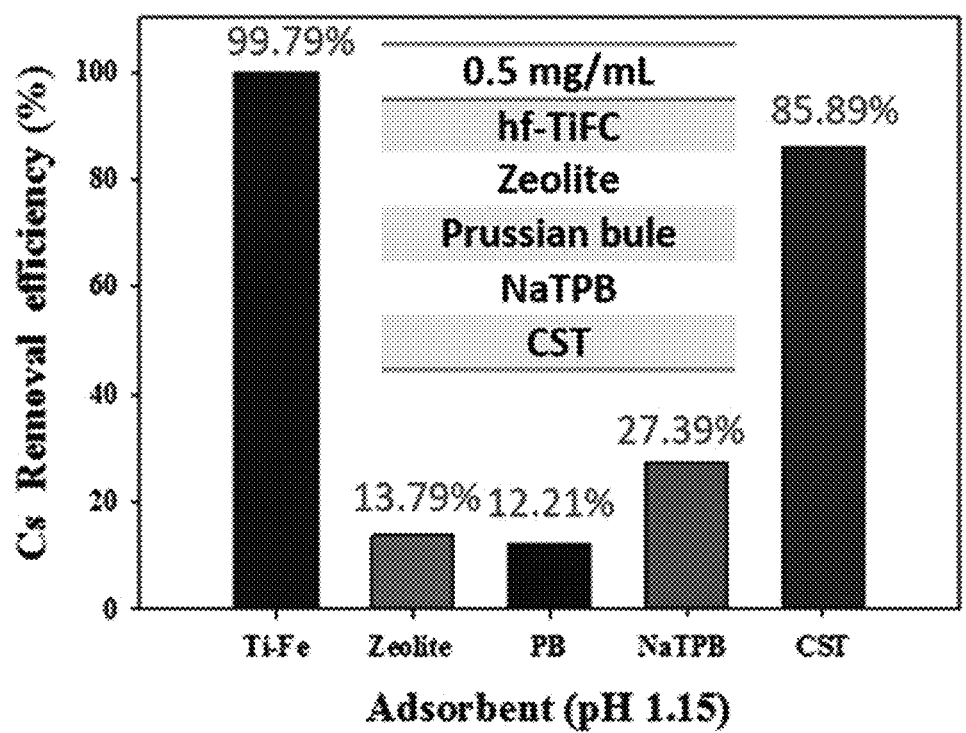
FIG. 20 shows the graph of comparing whether Cs ions in strongly acidic soil liquid waste can be selectively removed using various adsorbents.

In addition, the effects of soil components (Al, Fe, Mg, Si, etc.) present in a strong acidic soil liquid waste were evaluated, and the result is shown in FIG. 20.

As shown in FIG. 20, it is confirmed that, when 0.35 g of Cs-contaminated soil was decontaminated with 35 mL of oxalic acid (strong acid), the soil components are partially dissolved such that the Al, Fe, Mg and Si ions are more present than Cs ions in a strong acidic soil liquid waste (pH 1.15) (Al ion=470 ppm, Fe ion=641.6 ppm, Mg ion=1100 ppm, Si ion=147.5 ppm and Cs ion=32.4 ppm). To selectively remove Cs ions in the strong acidic soil liquid waste, by using various adsorbents, it was confirmed that hf-TiFC has better Cs adsorption capacity than other adsorbents including commercial CST.

Sr Adsorption Tests According to Reaction Time of Ti$^{4+}$ and FC

Additionally, 100 mg of hydrated TiO$_2$ particles were dispersed in a 1.5 M HCl solution, and rapidly mixed with an FC-containing 1.5 M HCl solution, thereby preparing a dispersion, and here, the concentration of the TiO$_2$ particles in the dispersion is 1.0 g/L, and the FC concentration is 0.2 M. Afterward, radionuclide adsorbents were prepared by reactions performed for various times, and an Sr adsorption test was performed using the resulting absorbents. Table 9 shows the Sr removal efficiency, q$_e$ value and Kd value according to the reaction time of Ti$^{4+}$ and FC. As shown in Table 9, when the reaction time of Ti$^{4+}$ and FC is 2 hours or less, a TiFC shell formed on a TiO$_2$ particle surface hides TiO$_2$ (core-shell structure), and thus Sr adsorption performance greatly decreases, and as the reaction time of Ti$^{4+}$ and FC becomes longer, an empty space is formed between the TiO$_2$ particles and the TiFC shell to widen an area where TiO$_2$ is exposed to a surrounding solution (yolk-shell structure), thus Sr adsorption performance is enhanced again. Therefore, when the reaction time of Ti$^{4+}$ and FC is 8 hours, maximum Sr adsorption performance is exhibited, the Kd value is 498.43 mL/g, which is approximately ½ of that of bare TiO$_2$, and this is because the TiO$_2$ particles are partly dissolved such that a site in the TiO$_2$ particle for Sr adsorption is reduced. Meanwhile, when the reaction time of Ti$^{4+}$ and FC is 12 hours or more, the TiO$_2$ particles are gradually diminished or completely dissolved in some regions, thereby degrading Sr adsorption performance Meanwhile, even when the TiO$_2$ particles are completely dissolved, Sr may be partly adsorbed, which is because Sr can be trapped in a hollow space.

TABLE 9

Sr removal efficiency, q$_e$ value and Kd value according to reaction time of Ti$^{4+}$ and FC (a ratio between the mass of an absorbent and the volume of a Cs solution was fixed at m/V = 0.5 g/L, and Sr adsorption time was 24 hours)

| | Concentration (ppm) | | Sr removal efficiency (%) | q$_e$ (mg/g) | K$_d$ (mL/g) |
|---|---|---|---|---|---|
| | Initial Sr$^{2+}$(C$_0$) | Equilibrium Sr$^{2+}$(C$_f$) | | | |
| 2 hrs | 48.67 | 47.11 | 3.205 | 3.12 | 66.23 |
| 4 hrs | 47.62 | 44.66 | 6.216 | 5.92 | 132.56 |
| 6 hrs | 47.62 | 40.02 | 15.96 | 15.20 | 379.81 |
| 8 hrs | 47.62 | 38.12 | 19.95 | 19.00 | 498.43 |
| 10 hrs | 47.62 | 41.16 | 13.57 | 12.92 | 313.90 |
| 12 hrs | 47.62 | 41.89 | 12.03 | 11.46 | 273.57 |
| Bare TiO$_2$ (control) | 89.5 | 45.9 | 48.72 | 43.6 | 949.89 |

Example 2: Preparation of Bead-Type Radionuclide Adsorbent

Preparation of Bead-Type Radionuclide Adsorbent to which Hf—TiFC was Applied

Figure 21:
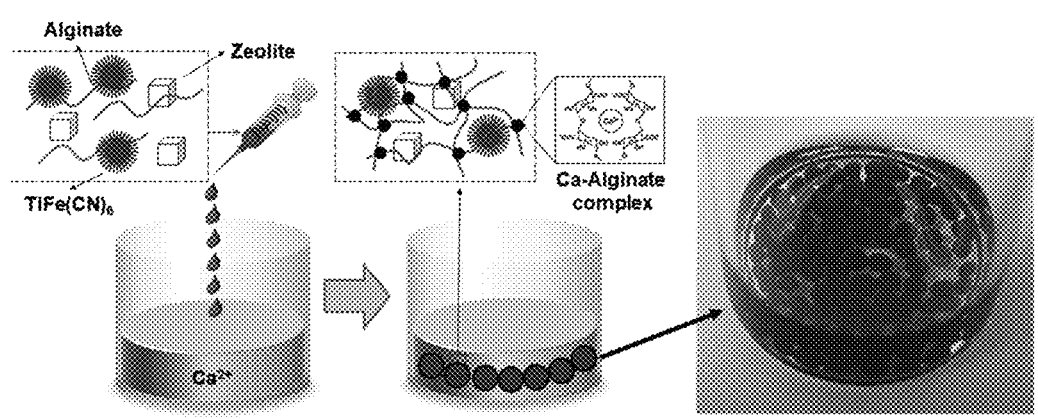
FIG. 21 is a schematic diagram illustrating the process of preparing alginate beads to which NaX and hf-TiFC are applied.

First, a 2% (w/v) sodium alginate solution was prepared by solubilizing sodium alginate in deionized water. Here, the resulting solution is a yellow viscous solution. Meanwhile, to apply an adsorbent to a sodium alginate solution, provided that a weight of the 2% (w/v) sodium alginate solution was 1, the weight of added NaX (Na$_{86}$(AlO$_2$)$_{86}$(SiO$_2$)$_{106}$·xH$_2$O, 2 μm, Sigma-Aldrich) was adjusted to 0.5 to 2, and the weight of the added hf-TiFC was adjusted to 0.5 to 2, thereby preparing a sodium alginate composition. The resulting composition was sufficiently mixed, and then dropped into a CaCl$_2$ solution drop by drop using a pipette. As a result, alginate gel beads are not formed in 0.01 M and 0.05 M CaCl$_2$ solutions, which is because a Ca-alginate gel is not sufficiently crosslinked due to a low concentration of Ca ions. Accordingly, to sufficiently form a Ca-alginate gel, the CaCl$_2$ solution was fixed at 0.5 M. The right image of FIG. 21 shows alginate gel beads (Bead-3) prepared by adjusting the weights of both of the added NaX and hf-TiFC to 2 when the weight of the 2% (w/v) sodium alginate solution was 1, the average particle size of the alginate gel beads is approximately 1 to 2 mm Afterward, the formed alginate gel beads were solidified in the $CaCl_2$ solution with stirring for 24 hours, and then sufficiently washed with distilled water. It was identified that the finally formed alginate beads are dark cyan, which is the color of hf-TiFC, and the aqueous solution in which the finally formed alginate beads are dispersed is clear, indicating that the NaX (white) or hf-TiFC (cyan) in the finally formed alginate beads were not re-released to the outside, and thus both of the NaX and hf-TiFC are successfully encapsulated in the alginate beads.

TABLE 10

Weight ratio of 2% (w/v) sodium alginate solution, NaX and hf-TiFC to finally prepare NaX and hf-TiFC-applied alginate beads

|  | 2% (w/v) sodium alginate solution | NaX | hf-TiFC |
| --- | --- | --- | --- |
| Bare bead | 1 | 0 | 0 |
| Bead-1 | 1 | 0.5 | 0.5 |
| Bead-2 | 1 | 1 | 1 |
| Bead-3 | 1 | 2 | 2 |

Characterization of Hf—TiFC-Applied Bead-Type Radionuclide Adsorbent

Figure 22:
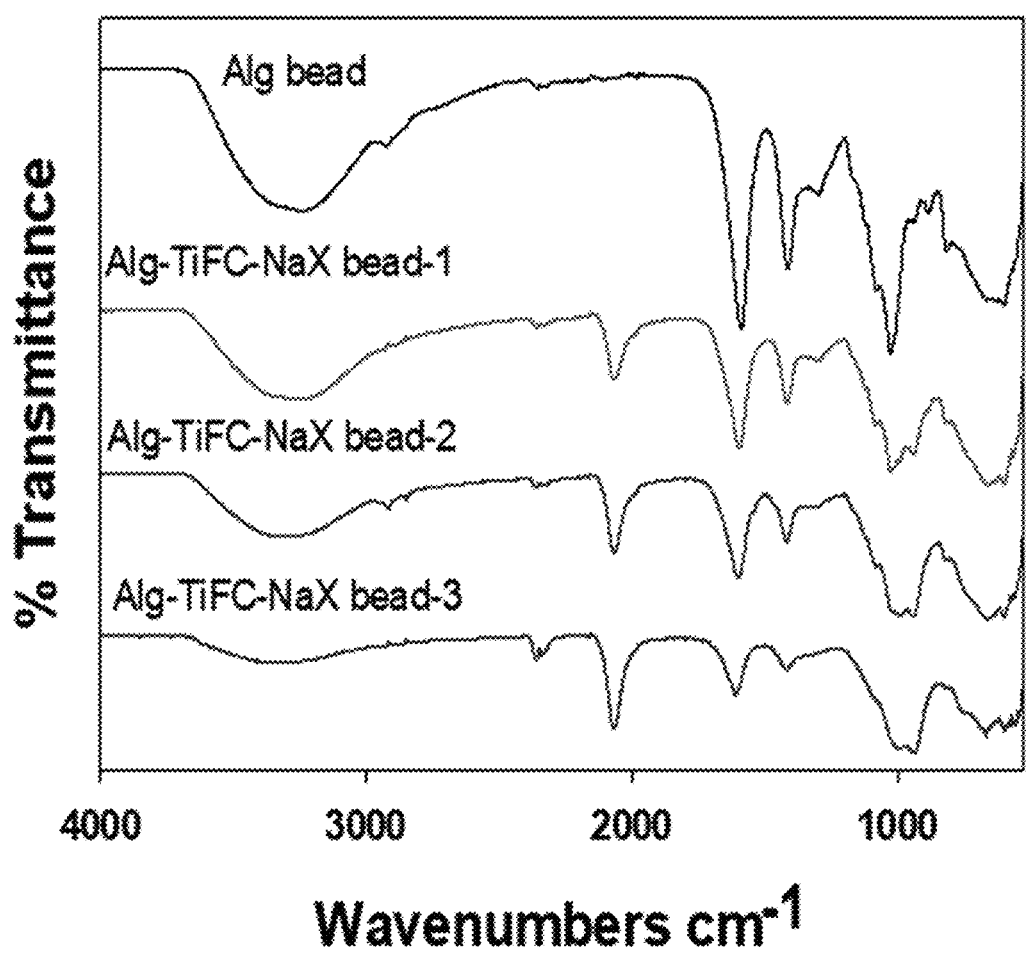
FIG. 22 is a graph indicating the FTIR spectra analysis results for various alginate beads (Bare bead, Bead-1, Bead-2 and Bead-3).

FIG. 22 shows the FTIR spectroscopy results for the finally formed alginate beads according to the weight ratios listed in Table 10. As sodium alginate has various functional groups, several peaks may be detected. As seen from the FTIR spectroscopy result for pure alginate, there is a strong peak at 3000-3500 $cm^{-1}$, indicating the presence of —OH. In addition, the peaks detected at 1613 and 1417 $cm^{-1}$ indicate asymmetric and symmetric stretching vibrations of —COOH, respectively. In addition, the peaks at 1027 $cm^{-1}$ and 1097 $cm^{-1}$ indicate OC—OH. Alginate beads formed after crosslinking with Ca ions showed new peaks at 3610 and 1670 $cm^{-1}$, and this change may be seen as a peak shown by crosslinking of the OH— and —COO of the sodium alginate. As shown in FIG. 22, all of the finally formed alginate beads show a peak at 1670 $cm^{-1}$, indicating that a Ca-alginate gel is formed. In addition, when FTIR spectra of alginate beads to which adsorbents such as hf-TiFC and NaX are applied and alginate beads to which an adsorbent is not applied were compared, in all FTIR spectra for the adsorbent-applied alginate beads (bead-1, bead-2 and bead-3), a new strong peak is shown at 2065 $cm^{-1}$. This indicates the stretching vibration of a cyanide group (—C≡N—), which results from the cyanide group of ferrocyanide in hf-TiFC. Therefore, it is confirmed that hf-TiFC is successfully encapsulated in the alginate beads.

Figure 23:
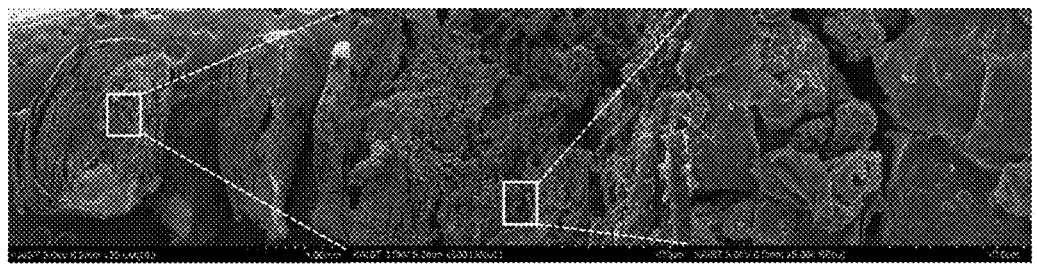
FIG. 23 is a SEM image for analyzing the inside of the alginate bead (Bead-3) to which NaX and hf-TiFC are applied.

In addition, to examine the structure of the adsorbent-applied alginate beads, the inside of bead-3 was analyzed by SEM. The average particle size of NaX is approximately 2 μm, and the average particle size of hf-TiFC is approximately 2 μm. As shown in FIG. 23, it can be confirmed that NaX and hf-TiFC are successfully encapsulated in the alginate beads. Further, the alginate beads are formed in a porous micro structure having a wide distribution of pore sizes, and Cs and Sr ions present in the aqueous solution may freely migrate into the beads. This characteristic was expected to facilitate the removal of Cs and Sr ions by the adsorbents.

Figure 24:
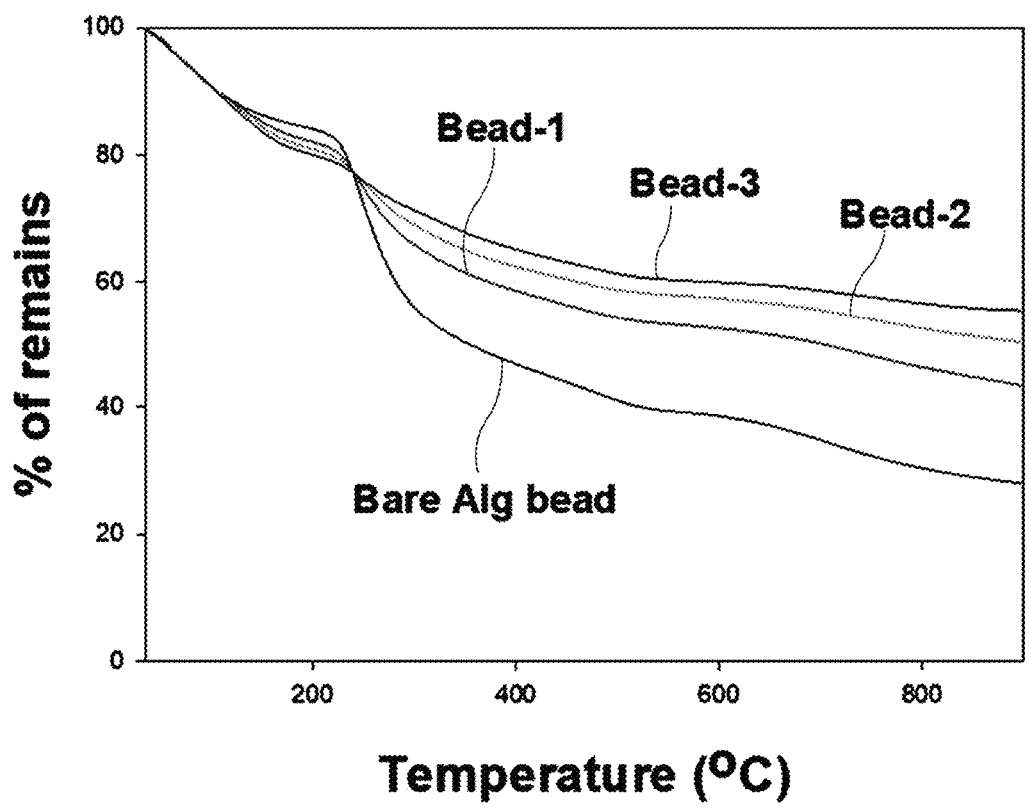
FIG. 24 is a graph of TGA analysis for examining the contents of organic/inorganic components in various alginate beads (Bare bead, Bead-1, Bead-2 and Bead-3).

In addition, to investigate the contents of the organic/inorganic components in various alginate beads (bead-1, bead-2 and bead-3) prepared according to the weight ratio of NaX and hf-TiFC, TGA analysis was performed, and the measurement result is shown in FIG. 24. As seen from the result, it can be confirmed that, as the weight ratios of the added NaX and hf-TiFC increase, after TGA analysis, it can be confirmed that the content of the remaining residue increases. Here, when the alginate beads to which an adsorbent is not applied is heated to 900° C., since an alginate polymer in the alginate beads is completely decomposed, most of the residue is determined to be Ca. Meanwhile, in the case of the NaX and hf-TiFC-added alginate beads (bead-1, bead-2 and bead-3), since only organic components of NaX and hf-TiFC are decomposed, inorganic components thereof remain as residues. Accordingly, with only the TGA analysis result, the contents of NaX and hf-TiFC included in the alginate beads (bead-1, bead-2 and bead-3) may not be exactly determined, and therefore, after the completely chemical decomposition of the alginate beads (bead-1, bead-2 and bead-3), the contents of inorganic components of NaX, such as Al and Si, and the content of an inorganic component of hf-TiFC, such as of Fe were analyzed, and then the result is shown in Table 11. As shown in Table 11, as the weight ratio of the added NaX and hf-TiFC increases, the contents of Al, Si and Fe increase, confirming that NaX and hf-TiFC were successfully encapsulated in the alginate beads.

Subsequently, the moisture adsorption characteristic of the formed alginate beads was evaluated by investigating the swelling ratios of the NaX and hf-TiFC-added alginate beads (bead-1, bead-2 and bead-3). The moisture adsorption characteristic is a very important index for removing Cs and Sr in contaminated water. The swelling ratios were measured using the following equation:

$$\text{Swelling Ratio}(SR)\% = (W_s - W_d)/W_d \times 100$$

Here, $W_d$ is a weight of the dried alginate beads after freeze-drying, and $W_s$ is a weight of alginate beads after being immersed in water for 48 hours. The swelling ratios of the alginate beads to which an adsorbent is not applied and the alginate beads (bead-1, bead-2 and bead-3) to which an adsorbent is applied were measured to be 4700, 1400, 940 and 770, respectively. As the weight ratios of NaX and hf-TiFC in the alginate beads increase, it is determined that the moisture adsorption characteristics of the alginate beads are degraded, and the swelling ratios are reduced. Although the moisture adsorption capacity of the original alginate beads after NaX and hf-TiFC are added was degraded, as confirmed in Table 11, since the resulting values exceeding at least 770% are sufficiently high to absorb Cs and Sr-containing contaminated water, they are determined to be suitable for contaminated water treatment.

TABLE 11

Contents of Al, Si and Fe in various alginate beads to which NaX and hf-TiFC are applied

|  | % residue from TGA | Al content from ICP (wt %) | Si content from ICP (wt %) | Fe content from ICP (wt %) | Swelling rate (%) |
| --- | --- | --- | --- | --- | --- |
| Bare bead | 28.03% | 0 | 0 | 0 | 4711% |
| bead-1 | 43.38% | 4.12 | 3.91 | 2.86 | 1400% |
| bead-2 | 50.37% | 5.82 | 5.69 | 3.90 | 940% |
| bead-3 | 55.37% | 6.72 | 6.48 | 5.98 | 770% |

Evaluation of Structural Stability of Hf—TiFC-Applied Bead-Type Radionuclide Adsorbent To evaluate the structural stability of the NaX and hf-TiFC-applied alginate beads under a groundwater condition, bead-3 was selected and dispersed in a groundwater-simulating aqueous solution, and the concentrations of Al and Ti in the aqueous solution over time were analyzed. As Al is a component of NaX and Ti is a component of hf-TiFC, the degree of dissolution over time for each adsorbent can be identified by measuring the concentrations of Al and Ti eluted over time. Provided that the initial concentrations of Al and Ti released from the alginate beads are 100%, the concentrations of Al and Ti released over time were converted into the unit of %, and then the result is shown in Table 12. As shown in Table 12, leaching amounts of Al and Ti released from the alginate beads were maintained at 0.07% or less, despite a long time of 2 weeks. From this result, the NaX and hf-TiFC-applied alginate beads maintained very stable structures under a groundwater condition for 2 weeks, and are determined as adsorption media that can be applied for a long time in actual purification of contaminated groundwater.

TABLE 12

Leaching amounts of Al and Ti released over time from NaX and hf-TiFC-

|  | 1 day | 3 days | 1 week | 2 weeks |
| --- | --- | --- | --- | --- |
| Al (%) | 0.0075% or less | 0.0075% or less | 0.0075% or less | 0.0075% or less |
| Ti (%) | 0.02168% | 0.03696% | 0.04445% | 0.06609% | applied alginate beads under groundwater condition

Evaluation of Cs and Sr Adsorption Performance Under Distilled Water Condition

Figure 25:
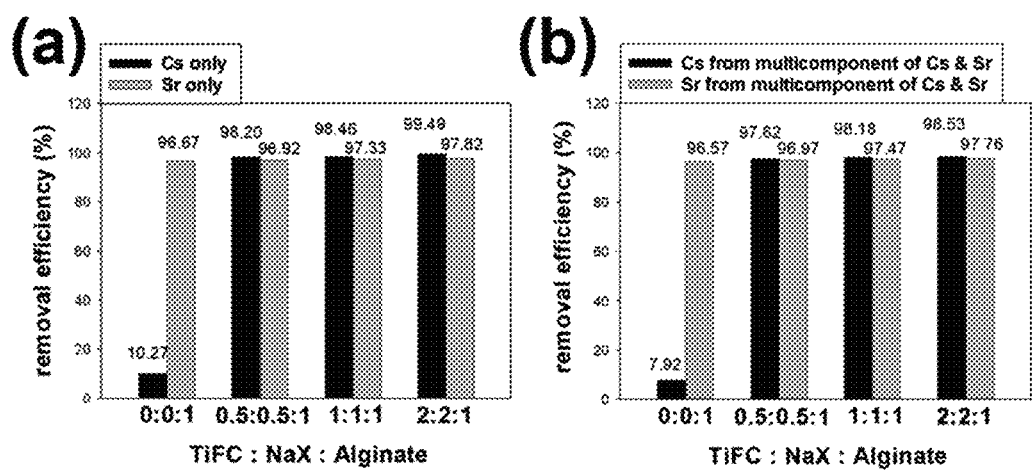
FIG. 25 are graphs for confirming whether $Cs^+$ or $Sr^{2+}$ is adsorbed onto various alginate beads (Bare bead, Bead-1, Bead-2 and Bead-3) when (a) $Cs^+$ (1 ppm) or $Sr^{2+}$ (1 ppm) is present in distilled water as a single component and (b) $Cs^+$ (1 ppm) and $Sr^{2+}$ (1 ppm) are present in distilled water as multiple components.

When there is $Cs^+$ (1 ppm) or $Sr^{2+}$ (1 ppm) as a single component in distilled water, it was confirmed whether various alginate beads adsorb $Cs^+$ or $Sr^{2+}$. 10 mg of various alginate beads were immersed in 10 mL of a $Cs^+$ (1 ppm) or $Sr^{2+}$ (1 ppm) solution and then stirred for 24 hours, followed by analyzing the $Cs^+$ or $Sr^{2+}$ concentration before/after adsorption through ICP-MS. As shown in FIG. 25(a), in the case of alginate beads to which NaX and hf-TiFC are not applied, it is confirmed that the Cs removal efficiency will be very low at 10.27%, which is because there is no adsorbent such as NaX or hf-TiFC in the alginate beads. On the other hand, it was confirmed that the Sr removal efficiency is very high at 96.67%, which seems to be due to an Sr-alginate crosslinking effect. That is, regardless of the presence or absence of NaX and hf-TiFC, in all alginate beads, Sr removal efficiency was excellent, at least 96.67%, but Cs removal efficiency was gradually increased as the contents of NaX and hf-TiFC increased, and in the case of bead-1 having the smallest contents of NaX and hf-TiFC, it is confirmed that the Cs removal efficiency is very high at 98.2%.

In addition, when there are $Cs^+$ (1 ppm) and $Sr^{2+}$ (1 ppm) as multiple components in distilled water, it was confirmed whether various alginate beads adsorb $Cs^+$ or $Sr^{2+}$. 10 mg of various alginate beads were immersed in 10 mL of a $Cs^+$ (1 ppm) and $Sr^{2+}$ (1 ppm) solution, and then stirred for 24 hours, followed by analyzing the concentrations of $Cs^+$ and $Sr^{2+}$ before/after adsorption through ICP-MS. As shown in FIG. 25(b), compared with the result of the single component, the simultaneous removal efficiency of $Cs^+$ and $Sr^{2+}$ is not greatly changed, and similar values of removal efficiency were maintained. This is because hf-TiFC has a characteristic of selectively adsorbing only Cs, whereas NaX is a general-purpose ion exchanger that enables ion exchange with various ions without distinction between $Cs^+$ and $Sr^{2+}$. From these results, it was confirmed that the NaX and hf-TiFC-applied alginate beads can remove 97% or more of $Cs^+$ and $Sr^{2+}$ under a distilled water condition at the same time.

Figure 26:
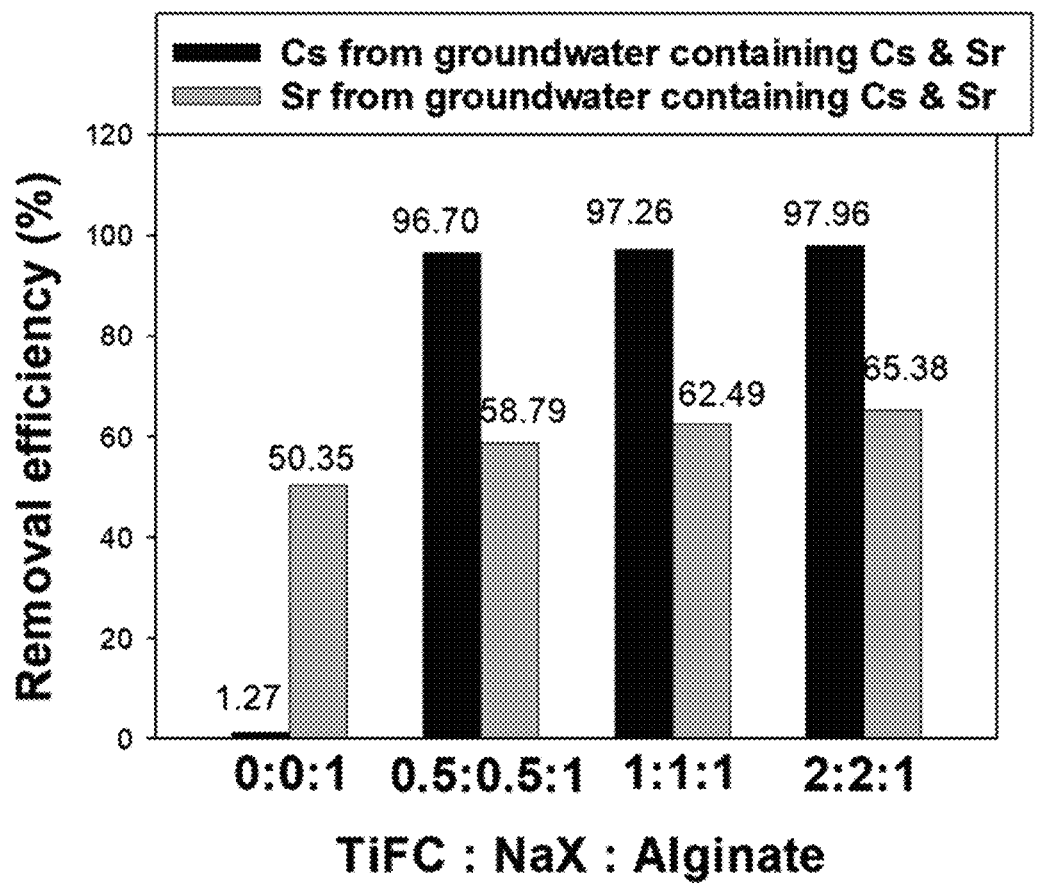
FIG. 26 is a graph for confirming whether $Cs^+$ or $Sr^{2+}$ is adsorbed onto various alginate beads (Bare bead, Bead-1, Bead-2 and Bead-3) after $Cs^+$ (1 ppm) and $Sr^{2+}$ (0.667 ppm) are injected into a solution simulating a groundwater condition.

Evaluation of Cs and Sr Adsorption Performance Under Groundwater Condition $Cs^+$ (1 ppm) and $Sr^{2+}$ (0.667 ppm) were injected into a solution (Na ion=125 ppm, Ca ion=25 ppm, Mg ion=10 ppm and K ion=5 ppm) simulating a groundwater condition, and then it was confirmed whether various alginate beads adsorb $Cs^+$ or $Sr^{2+}$. The $Cs^+$ and $Sr^{2+}$ concentrations before/after adsorption were calculated through ICP-MS to calculate removal efficiency (%) and $K_d$ values. As shown in FIG. 26, in the case of the alginate beads to which NaX and hf-TiFC are not applied, the Cs removal efficiency was 1.27%, and due to a high concentration of competing ions, Cs was hardly adsorbed. However, due to the Sr-alginate crosslinking effect, despite the presence of competing ions, the Sr removal efficiency was 50.35%. Meanwhile, in the case of the NaX and hf-TiFC-applied alginate beads, due to the presence of hf-TiFC that can selectively adsorb Cs, the Cs removal efficiency was 96.7% or more, and as the content of hf-TiFC increased, the Cs removal efficiency gradually improved. Likewise, as the content of NaX increased, Sr removal efficiency was also slightly improved, but the maximum Sr removal efficiency was 65.38%, which was confirmed to be greatly decreased, compared with that under a distilled water condition. This is because NaX is an ion exchanger without selectivity for Sr, and Ca ions and Mg ions, which are competing ions of Sr (0.667 ppm) in the solution, are present in excess.

Figure 27:
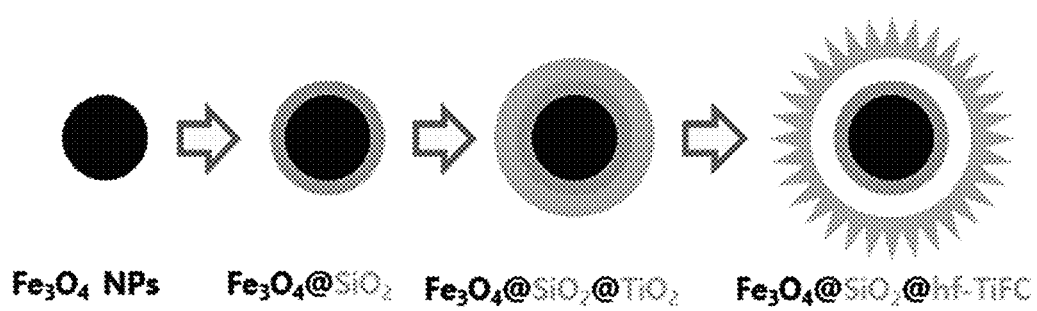
FIG. 27 is a schematic diagram illustrating the process of preparing an adsorbent in which hf-TiFC is applied on a magnetic core.

Example 3: Preparation of Magnetic Radionuclide Adsorbent $Fe_3O_4$ nanoparticles (average diameter: 100 nm) were prepared, and a 10 nm-thick $SiO_2$ layer was then coated thereon. A 10 to 200 nm-thick $TiO_2$ layer was coated on the surface of the $SiO_2$ layer-coated $Fe_3O_4$ nanoparticles. The $TiO_2$ layer/$SiO_2$ layer-coated magnetic particles (100 mg) were dispersed in a 1.5 M HCl solution, and then a 1.5 M HCl solution containing potassium ferrocyanide (FC, $K_4Fe(CN)_6 \cdot 3H_2O$) was applied. The concentration of particles in the total applied solution is 1.0 g/L, and an FC concentration is 0.2 M. Subsequently, a magnetic radionuclide adsorbent having flower-like titanium ferrocyanide was prepared by a reaction at 25° C. for 12 hours (see FIG. 27).

Example 4: Preparation of Composite Radionuclide Adsorbent

Figure 16:
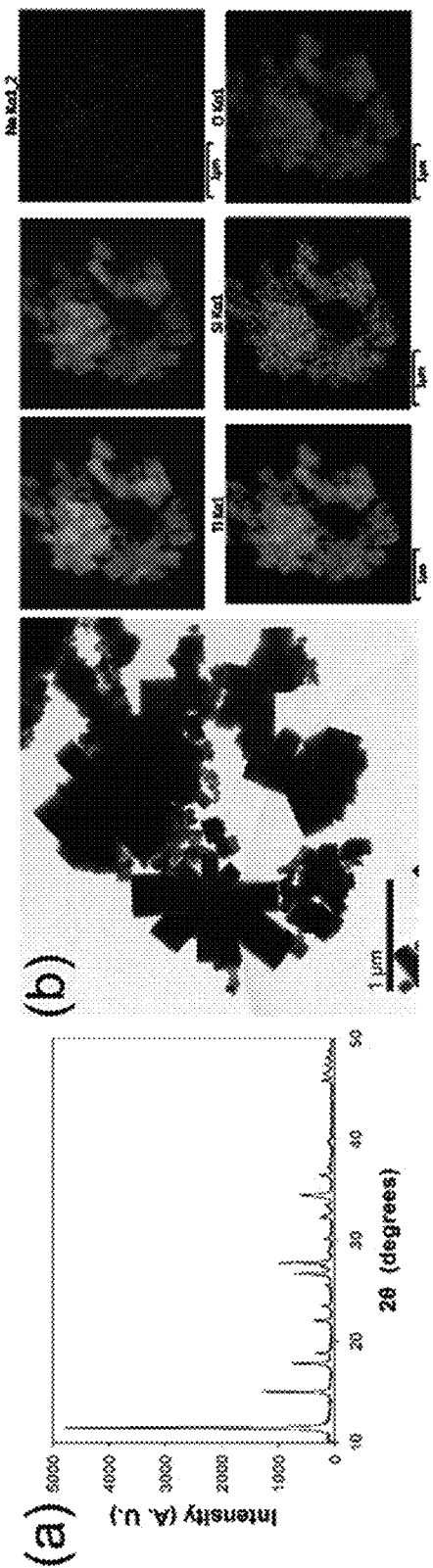
FIG. 16 shows the (a) XRD pattern graph and (b) TEM and EDS elemental mapping of HCST.
Figure 17:
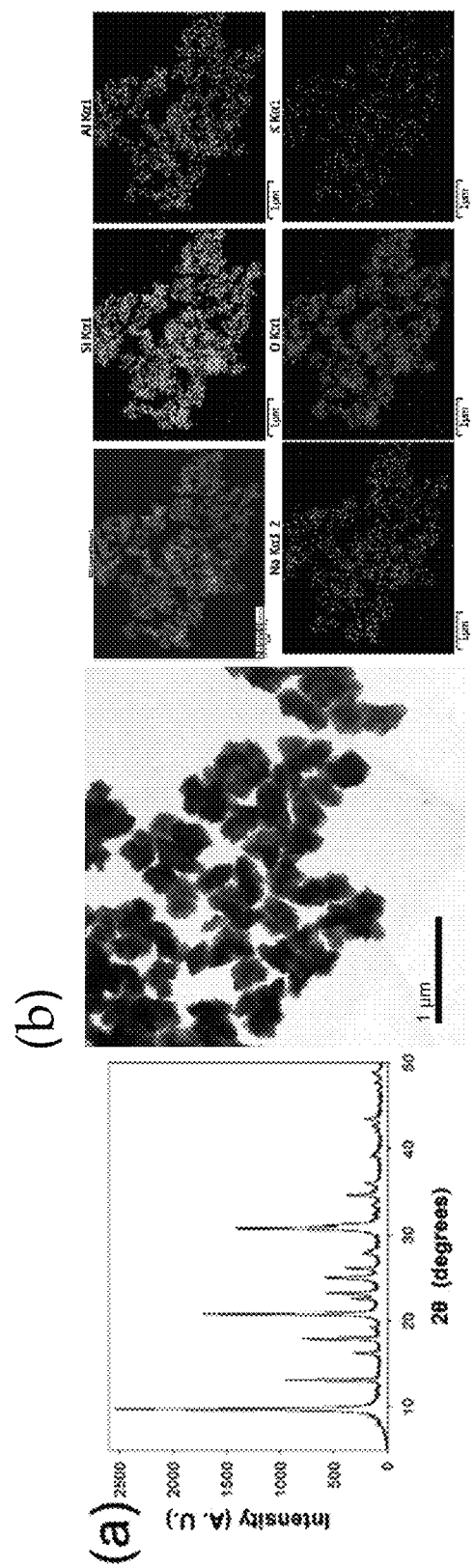
FIG. 17 shows the (a) XRD pattern graph and (b) TEM and EDS elemental mapping of CHA.
Figure 28:
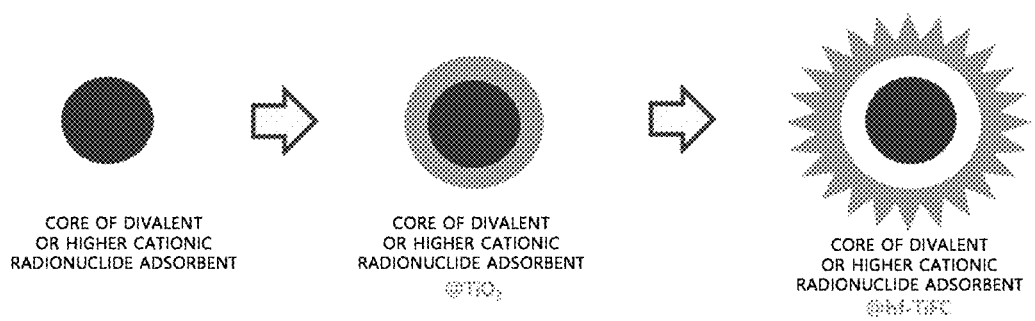
FIG. 28 is a schematic diagram illustrating the process of preparing an adsorbent in which hf-TiFC is applied on the core of a divalent or higher cationic radionuclide adsorbent.

Sodium crystalline silicotitanate (Na-CST; sodium crystalline silicotitanate synthesized to prepare HCST of FIG. 16, Poojary, D. M.; Cahill, R. A.; Clearfield, A. Synthesis, Crystal Structures, and Ion-Exchange Properties of a Novel Porous Titanosilicate. Chem. Mater. 1994, 6, 2364-2368.) was prepared, and a 10 to 200 nm-thick $TiO_2$ layer was coated on the surface thereof. The $TiO_2$ layer-coated nanoparticles (100 mg) were dispersed in a 1.5 M HCl solution, and then a 1.5 M HCl solution containing potassium ferrocyanide (FC, $K_4Fe(CN)_6 \cdot 3H_2O$) was applied. The concentration of the particles in the total applied solution is 1.0 g/L, and an FC concentration is 0.2 M. Subsequently, a composite radionuclide adsorbent having flower-like titanium ferrocyanide was prepared by a reaction at 25° C. for 12 hours (see FIG. 28).

It should be understood by those of ordinary skill in the art that the above description of the present invention is exemplary, and the exemplary embodiments disclosed herein can be easily modified into other specific forms without departing from the technical spirit or essential features of the present invention. Therefore, the exemplary embodiments described above should be interpreted as illustrative and not limited in any aspect.

What is claimed is:

1. A method of preparing a radionuclide adsorbent, comprising:
   (a) preparing a dispersion in which transition metal oxide particles and a ferrocyanide salt are dispersed in a 0.1 M to 2.0 M acidic solution; and
   (b) forming transition metal-ferrocyanide on the surface of the transition metal oxide particle by reacting transition metal ions and the ferrocyanide salt in the dispersion,
   wherein, in Step (a), the concentrations of the transition metal oxide particles and the ferrocyanide salt in the dispersion are 0.1 to 10.0 g/L and 0.001 to 1.0 M, respectively, and
   wherein, in Step (b), the reaction is performed at 20 to 40° C. for 2 to 26 hours.

2. The method of claim 1, wherein, in Step (a), the transition metal oxide particles include one or more of $TiO_2$, ZnO, CuO, $Cu_2O$, MnO, $MnO_2$, $Mn_2O_3$ and $Mn_3O_4$.

3. A radionuclide adsorbent, comprising:
   a hollow space; and a transition metal-ferrocyanide shell formed on the space surface,
   wherein the transition metal-ferrocyanide shell has a structure in which a plurality of two-dimensional nano flakes overlap, or a structure in which a plurality of three-dimensional nano polyhedrons agglomerate.

4. The adsorbent of claim 3, further comprising transition metal oxide particles, which are spaced apart from the transition metal-ferrocyanide shell, in the space.

5. The adsorbent of claim 3, wherein the radionuclide adsorbent selectively removes radioactive cesium; or a divalent or higher cationic radionuclide.

6. The adsorbent of claim 5, wherein the radioactive cesium or divalent or higher cationic radionuclide is present within a range of pH 1 to pH 11.

7. The adsorbent of claim 3, wherein the content of water in the radionuclide adsorbent is 10 to 20 wt % with respect to the total content of the radionuclide adsorbent, and the specific surface area of the radionuclide adsorbent is 10 to 300 $m^2/g$.

8. A bead-type radionuclide adsorbent, comprising:
   beads; and
   the radionuclide adsorbent of claim 3, encapsulated in the beads.

9. The adsorbent of claim 8, further comprising a divalent or higher cationic radionuclide adsorbent, encapsulated in the beads.

10. A composite radionuclide adsorbent, comprising:
    a core; and
    the radionuclide adsorbent of claim 3, formed on the core.

11. The adsorbent of claim 10, wherein the core is a magnetic core; or a core of a divalent or higher cationic radionuclide adsorbent.

12. A method of removing a radionuclide, comprising:
    dispersing the radionuclide adsorbent of claim 3 in a solution containing a radionuclide, and then recovering the radionuclide by adsorbing it onto the radionuclide adsorbent.

13. The method of claim 12, further comprising:
    converting the transition metal-ferrocyanide in the recovered radionuclide adsorbent into a transition metal carbonate.

* * * * *